United States Patent [19]

Roberts

[11] 4,032,280

[45] June 28, 1977

[54] FABRICATION OF BOX PARTS FROM PLASTIC MATERIAL

[75] Inventor: Frederick D. Roberts, Chalfont, Pa.

[73] Assignee: FMC Corporation, San Jose, Calif.

[22] Filed: Apr. 19, 1976

[21] Appl. No.: 678,332

Related U.S. Application Data

[62] Division of Ser. No. 570,903, April 23, 1975, Pat. No. 3,977,307.

[52] U.S. Cl. .............................. 425/383; 93/49 R
[51] Int. Cl.$^2$ .......................................... B31B 1/26
[58] Field of Search ..................... 93/49 R; 425/383

[56] References Cited

UNITED STATES PATENTS

| | | | |
|---|---|---|---|
| 2,618,207 | 11/1952 | Hery et al. | 93/49 R X |
| 2,871,772 | 2/1959 | Nelson | 93/49 R X |
| 2,898,819 | 8/1959 | Shields | 93/49 R |
| 3,096,692 | 7/1963 | Cratheon et al. | 93/49 R |
| 3,259,030 | 7/1966 | Cratheon et al. | 93/49 R |
| 3,425,393 | 2/1969 | Shah et al. | 93/49 R X |

*Primary Examiner*—Robert L. Spicer, Jr.
*Attorney, Agent, or Firm*—C. E. Tripp

[57] ABSTRACT

Box parts such as box bottoms and box lids are fabricated from notched blanks of plastic sheet material.

Relatively large boxes can be fabricated and the blank feed mechanism is actuated by a crank mechanism that runs at twice the speed of a main, one revolution per cycle drive shaft. An extension blank pusher can be added to produce smaller boxes. The tab folders have solvent applicators formed as grooved metal bars associated with a centralized solvent delivery and recovery system. The transverse folding dies are heated with a flexible, rope-like heating element to facilitate changes in die length. The feeding apparatus includes cam operated, vacuum cup lifter arm assemblies which lift the top blank from a stack and present it to vacuum cups on the feed pushers. These assemblies are longitudinally adjustable. The anvils that cooperate with the tab folders have heated bodies, but their clamp surfaces are insulated from the bodies.

11 Claims, 44 Drawing Figures

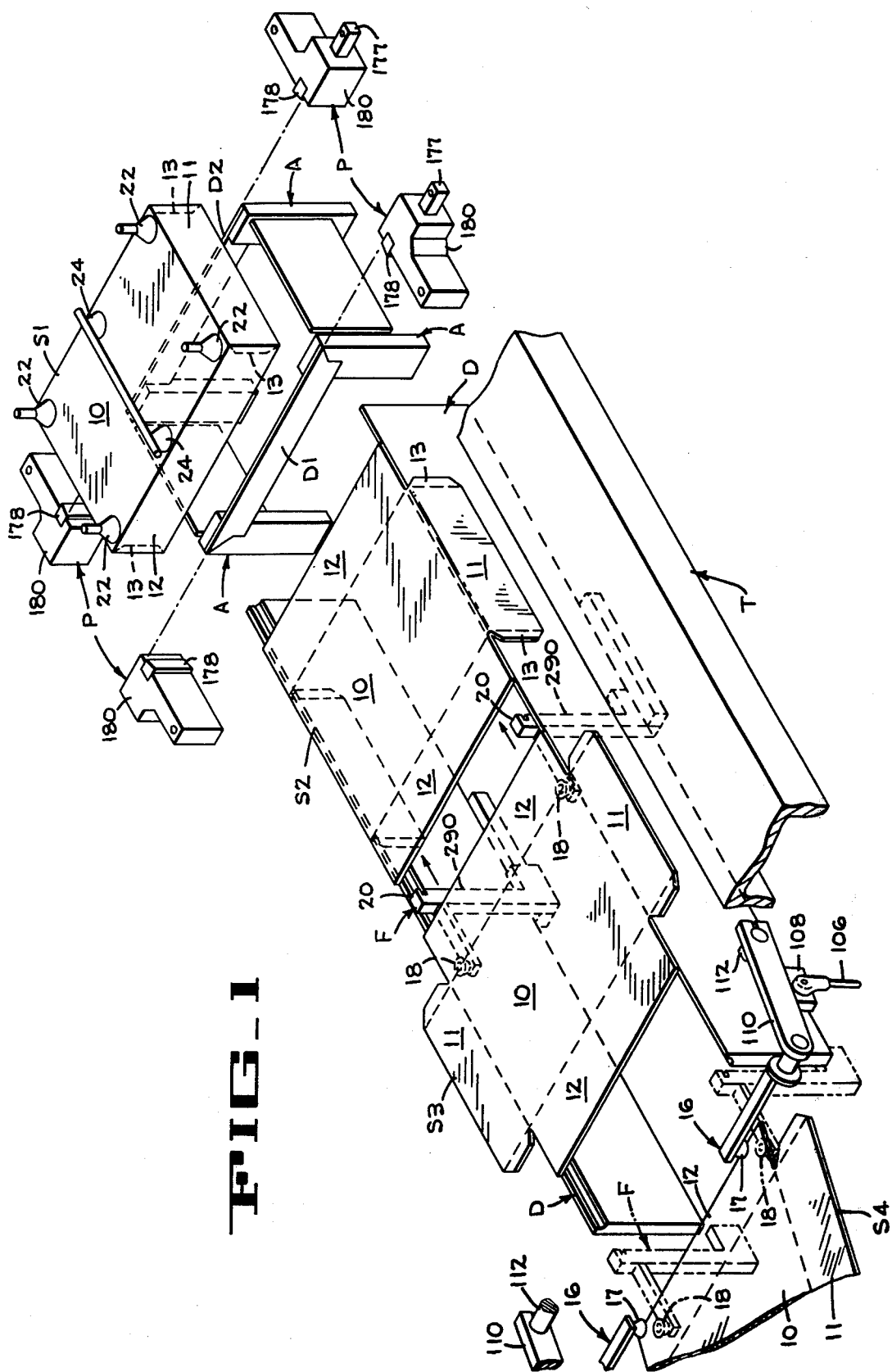

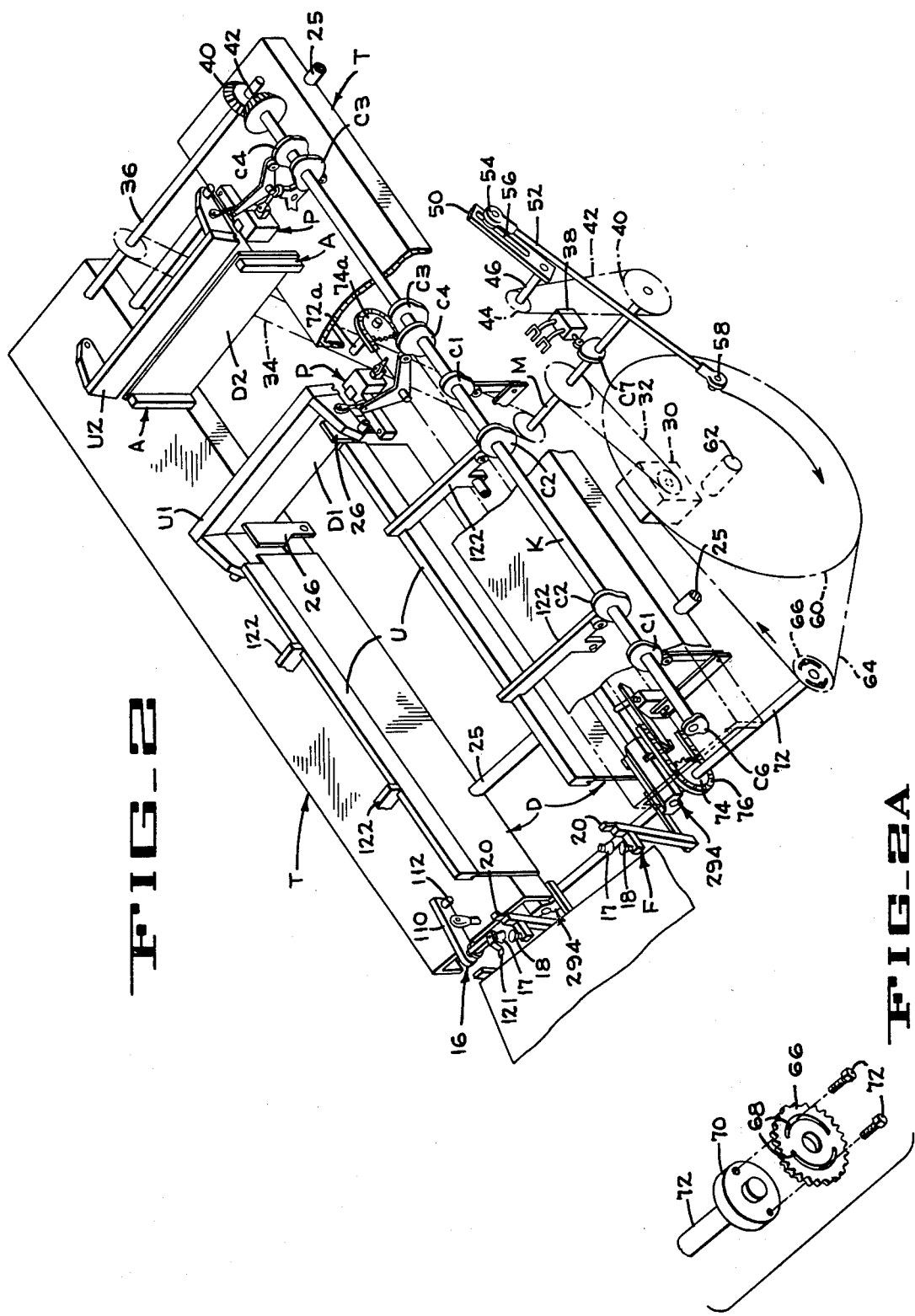

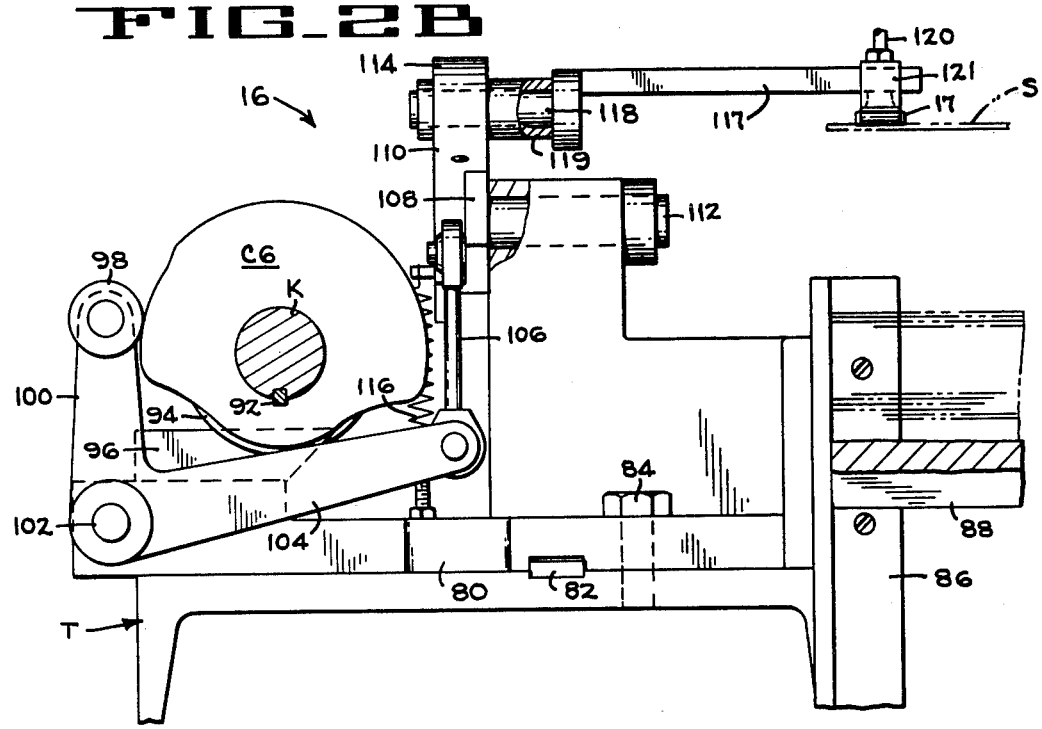
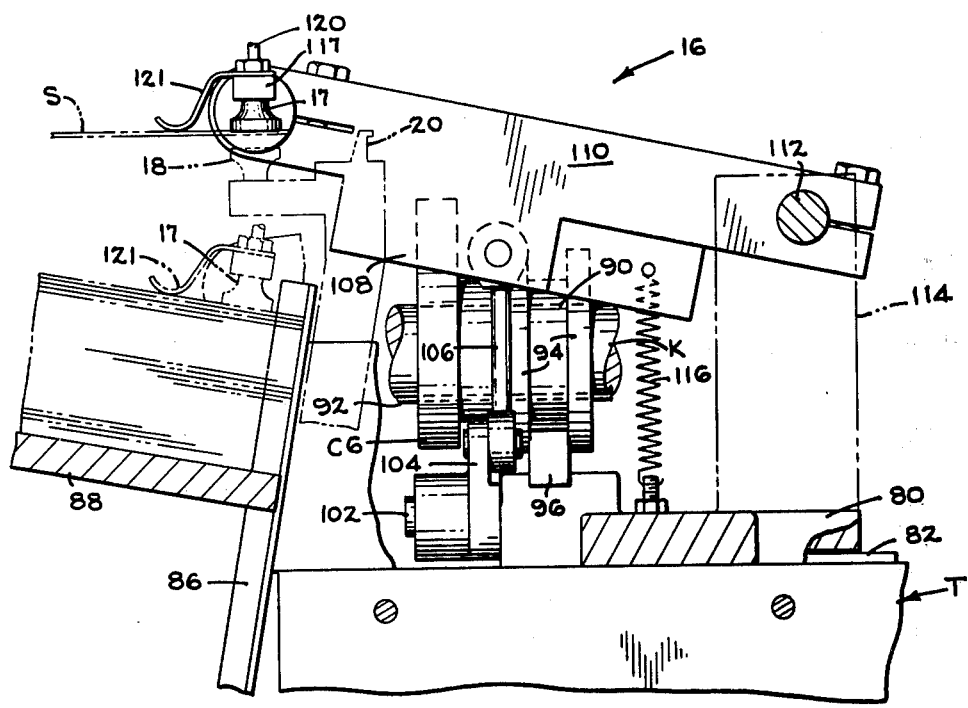

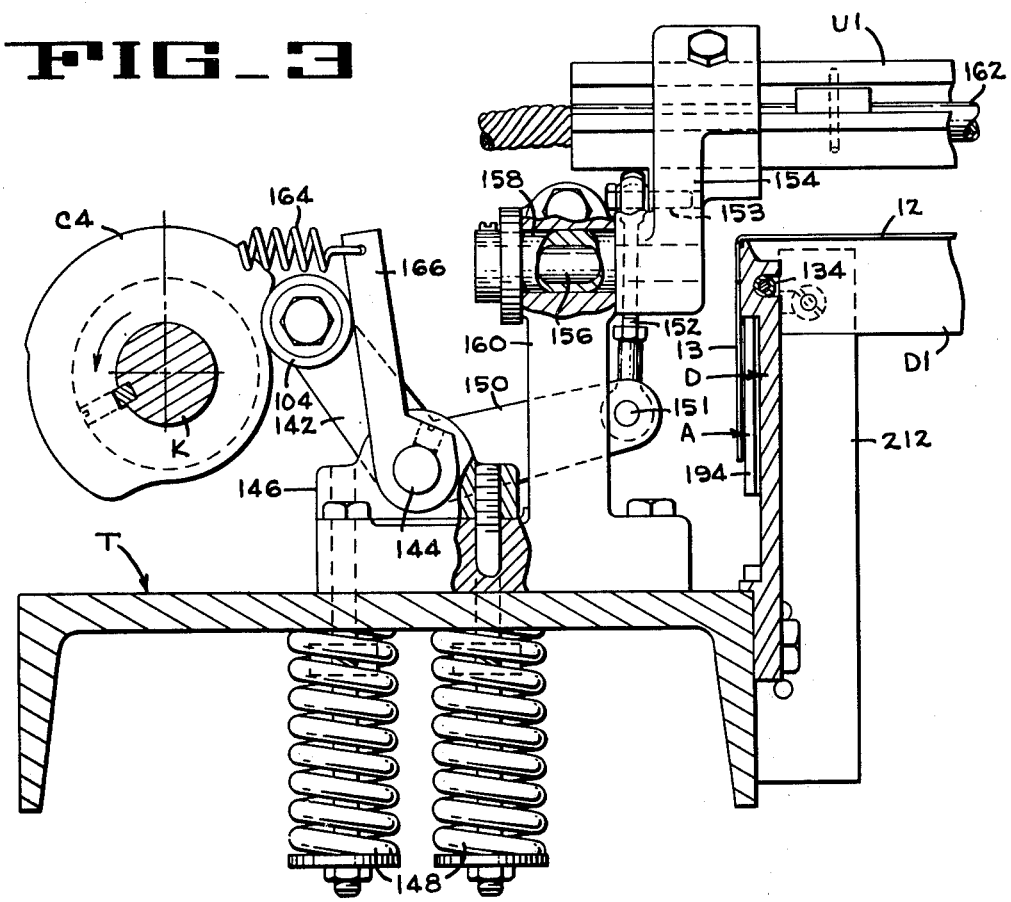
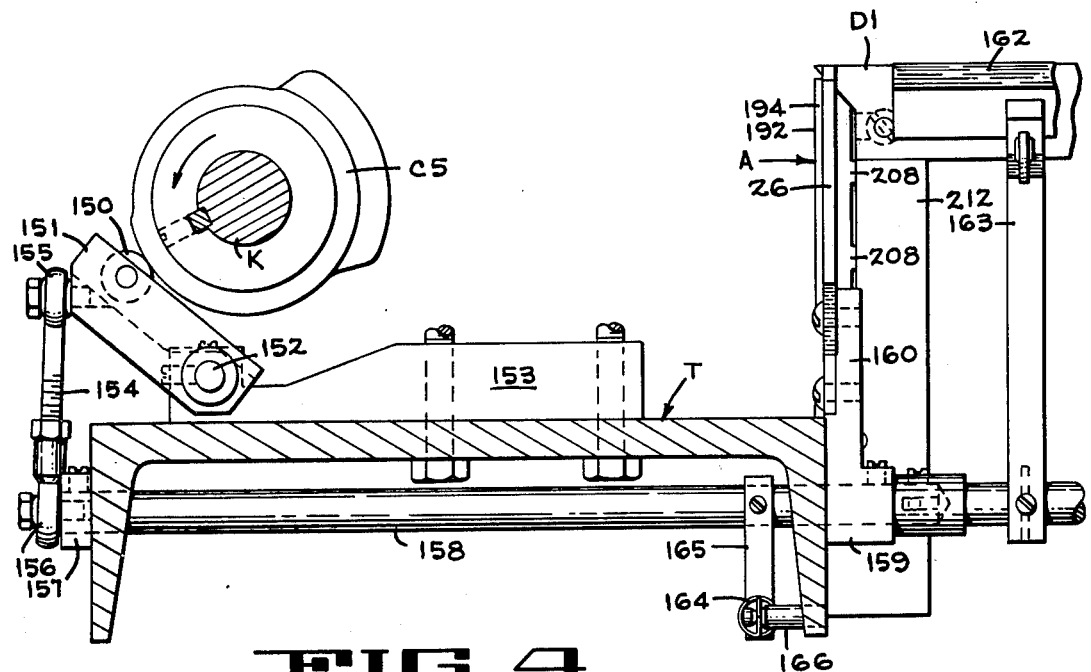

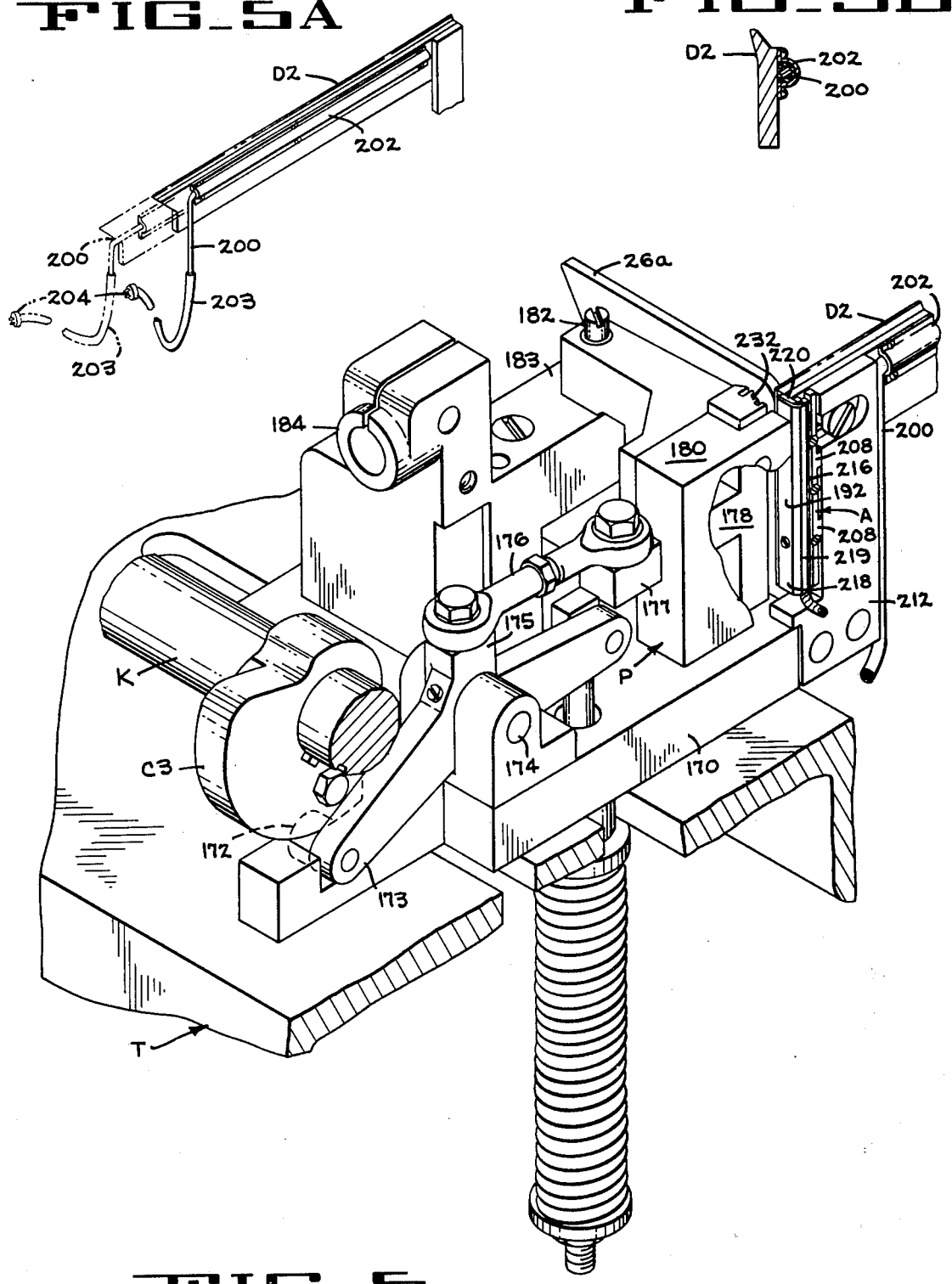

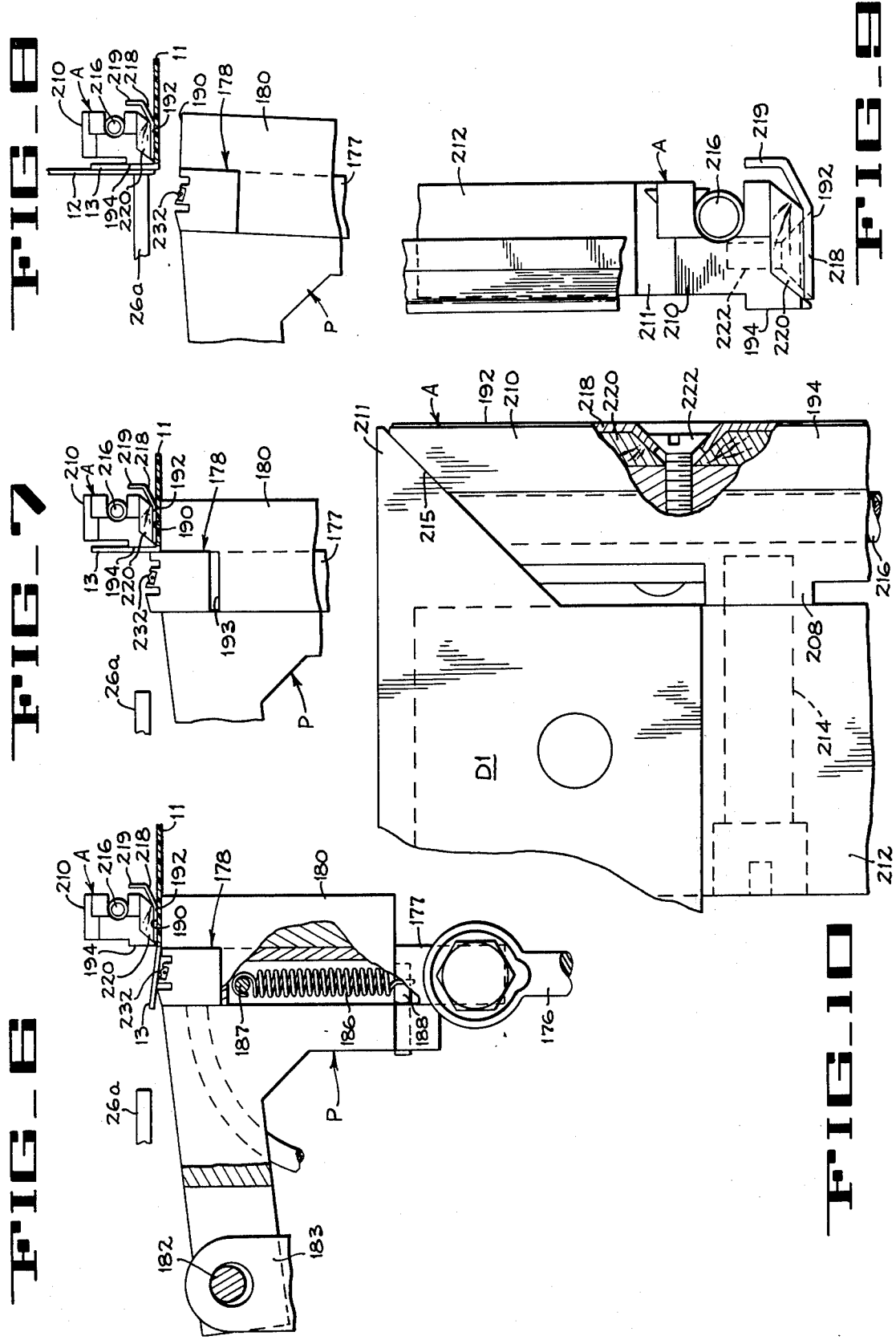

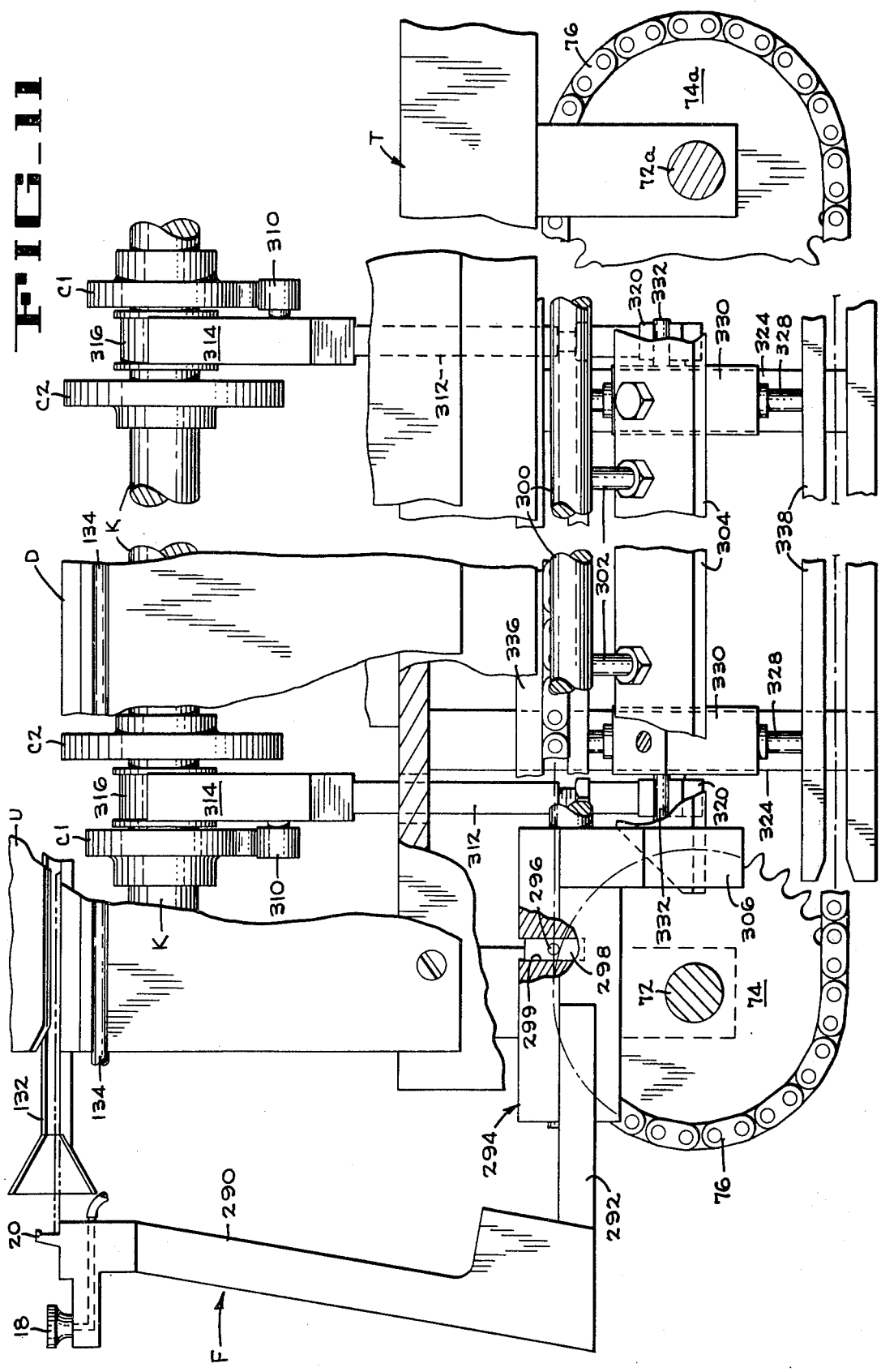

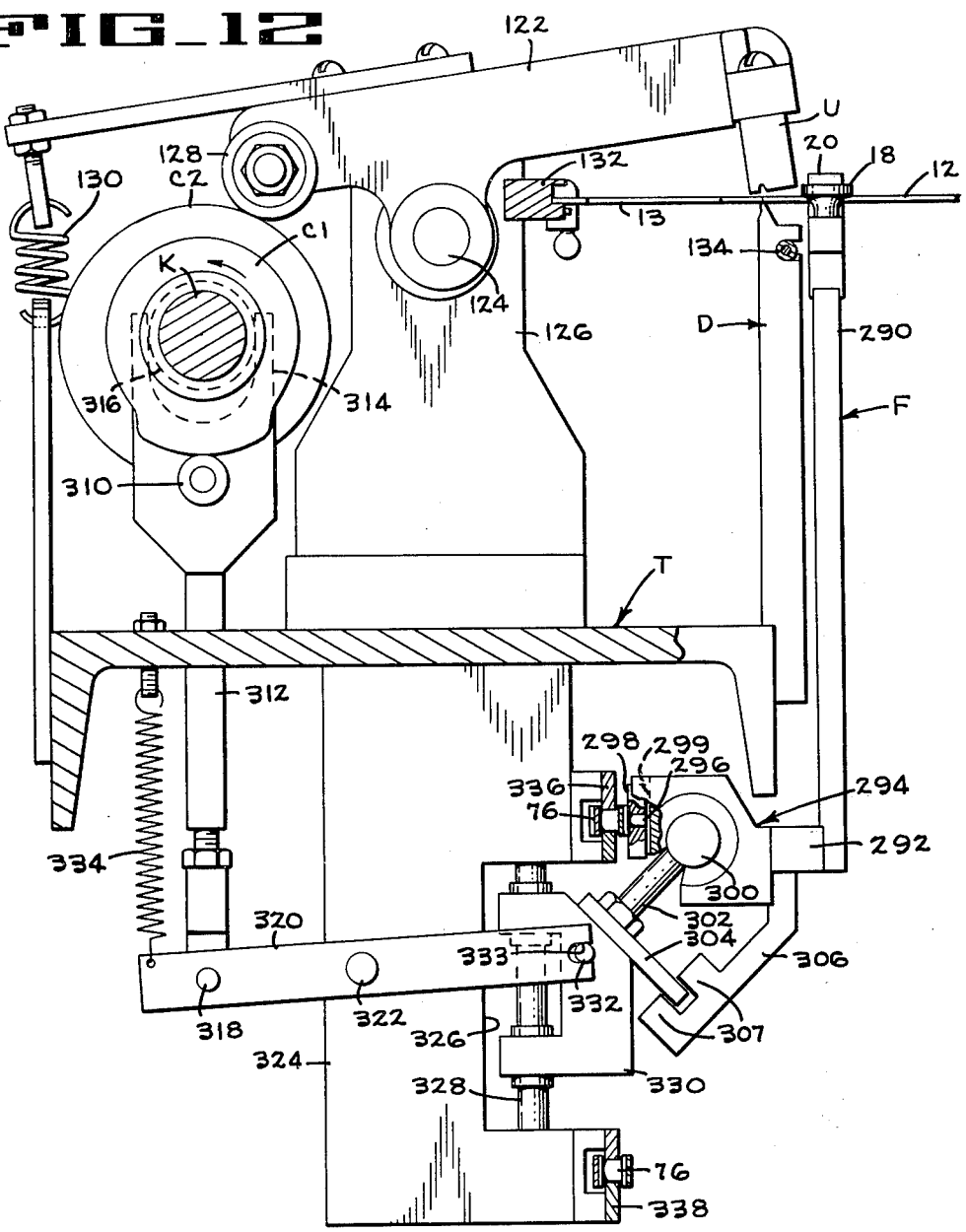

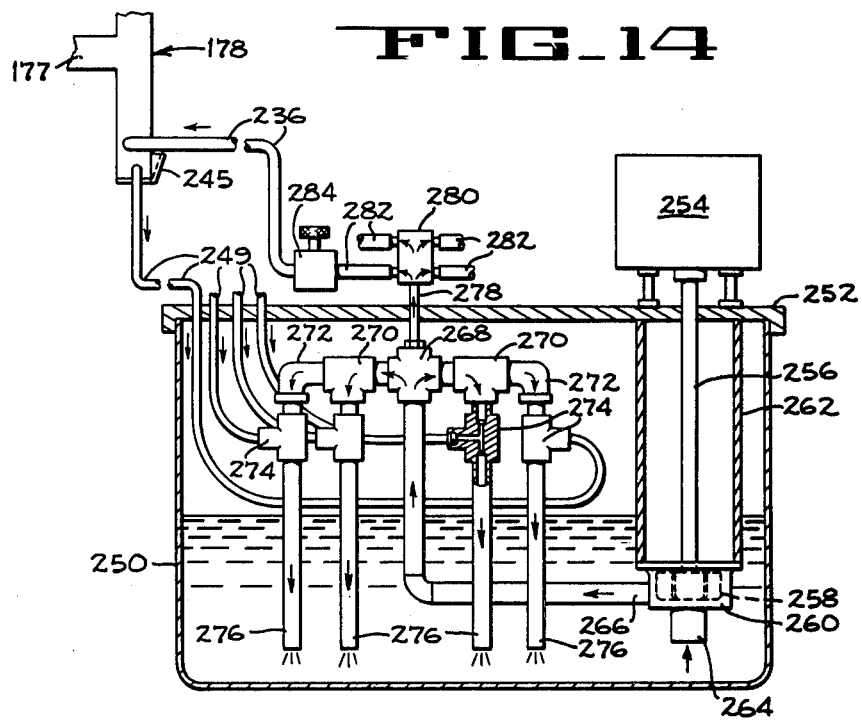
FIG_14
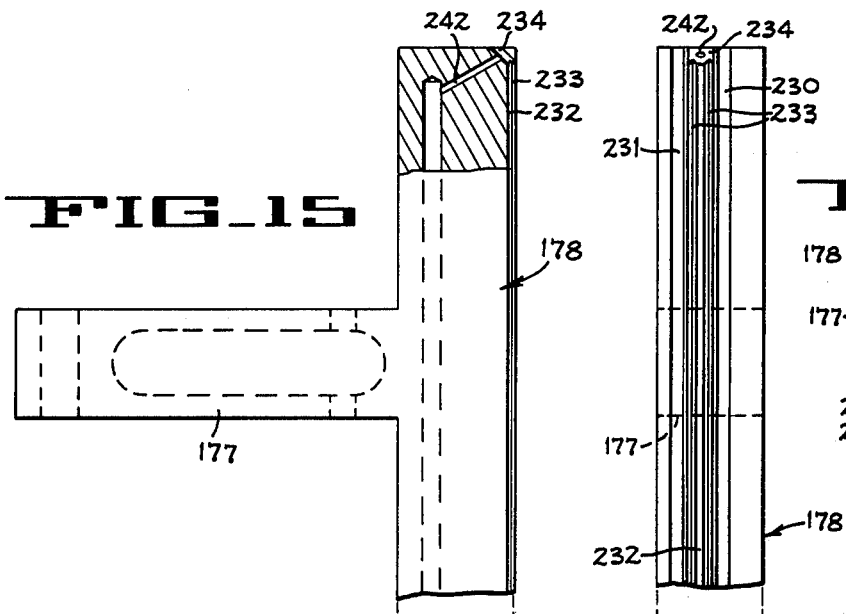
FIG_15
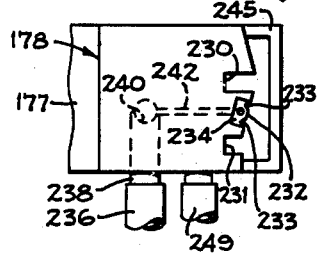
FIG_17
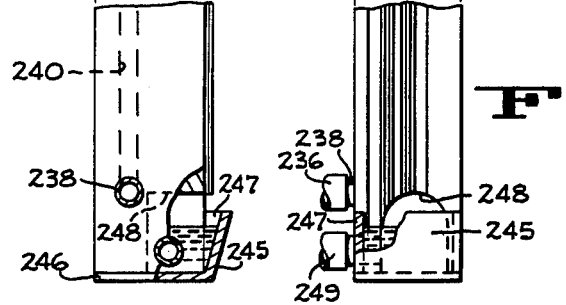
FIG_16

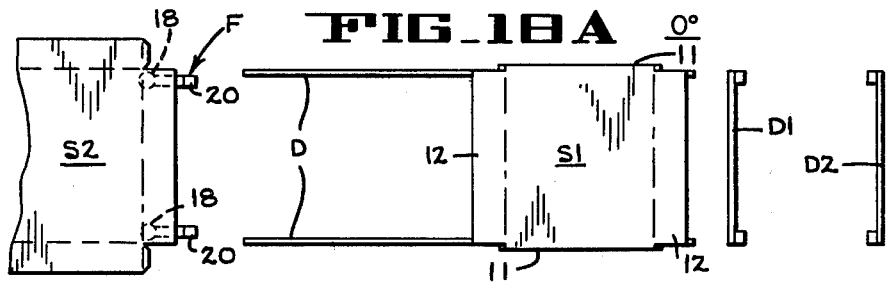
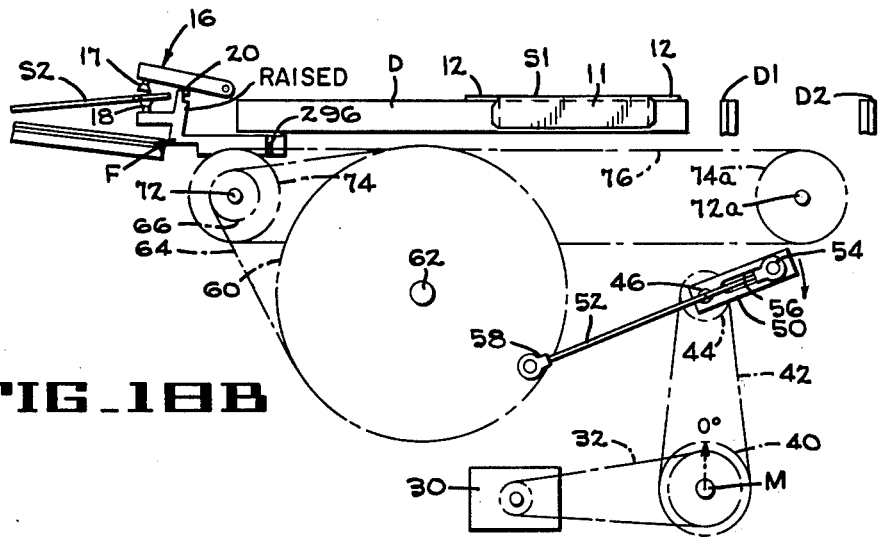
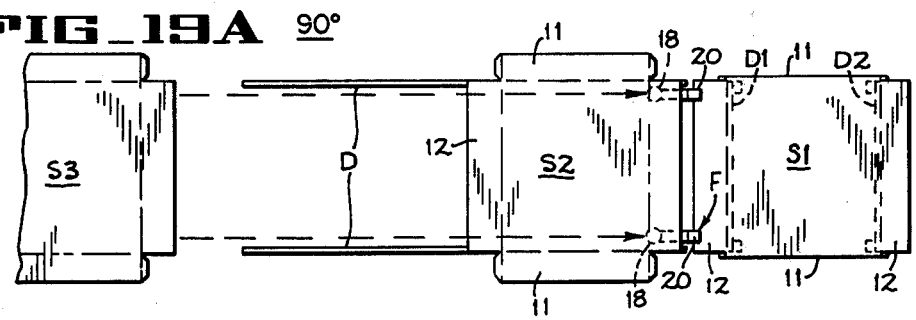
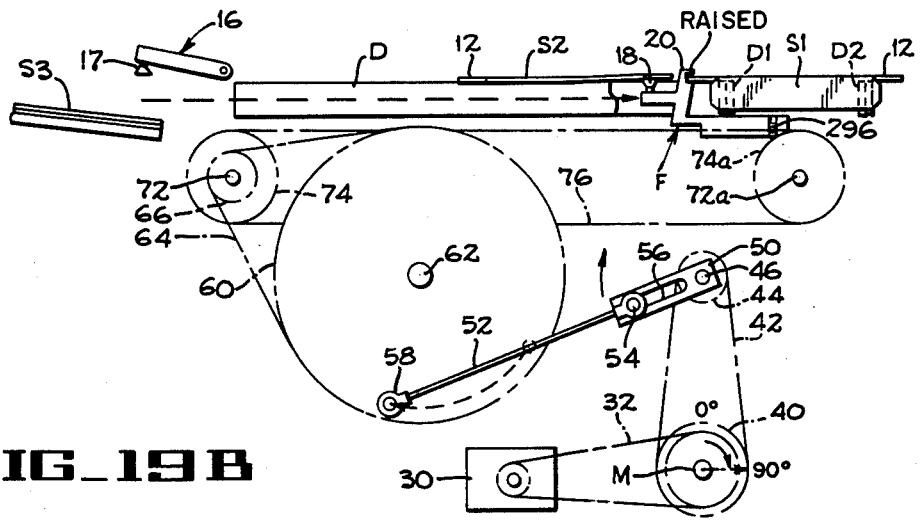

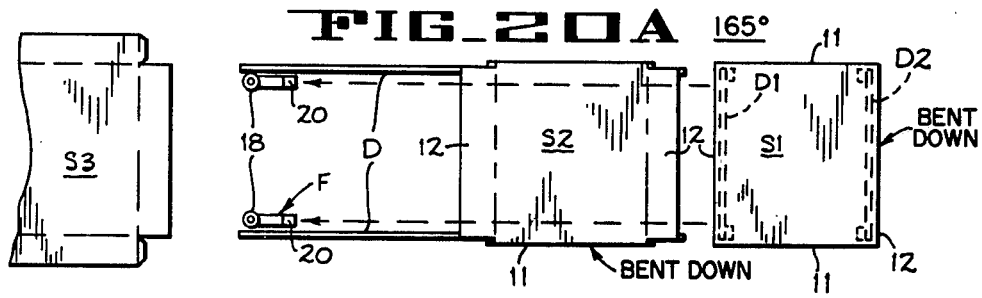
FIG_20A
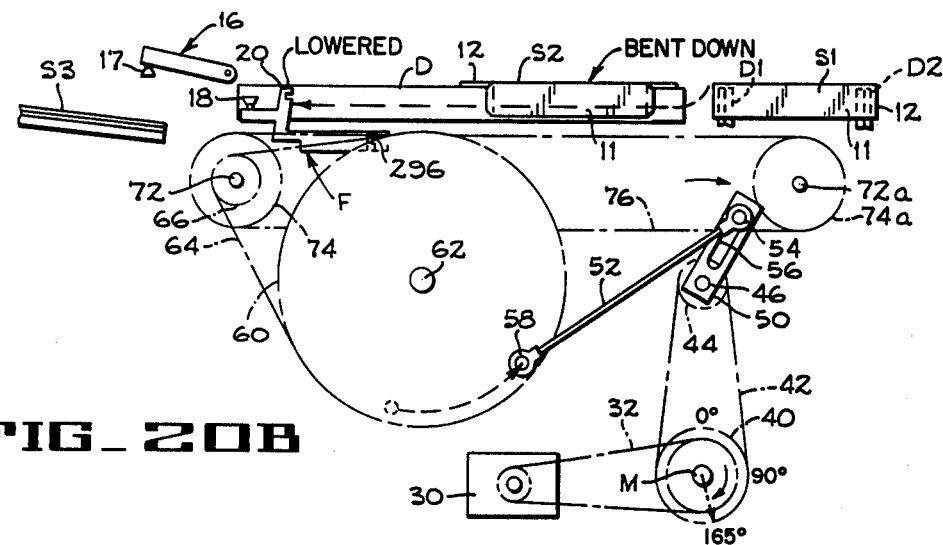
FIG_20B
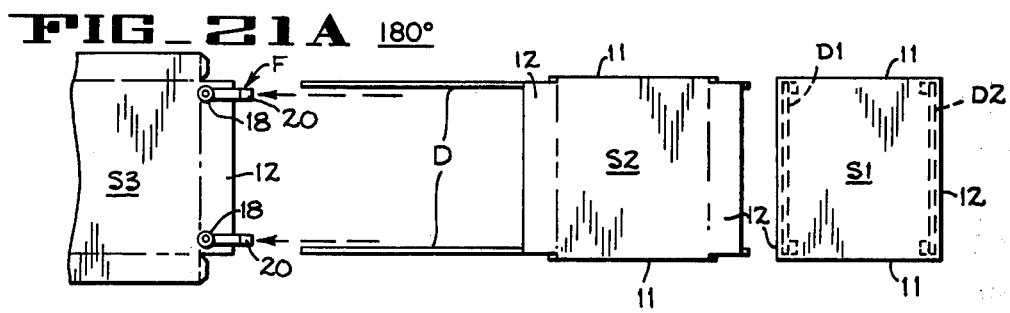
FIG_21A
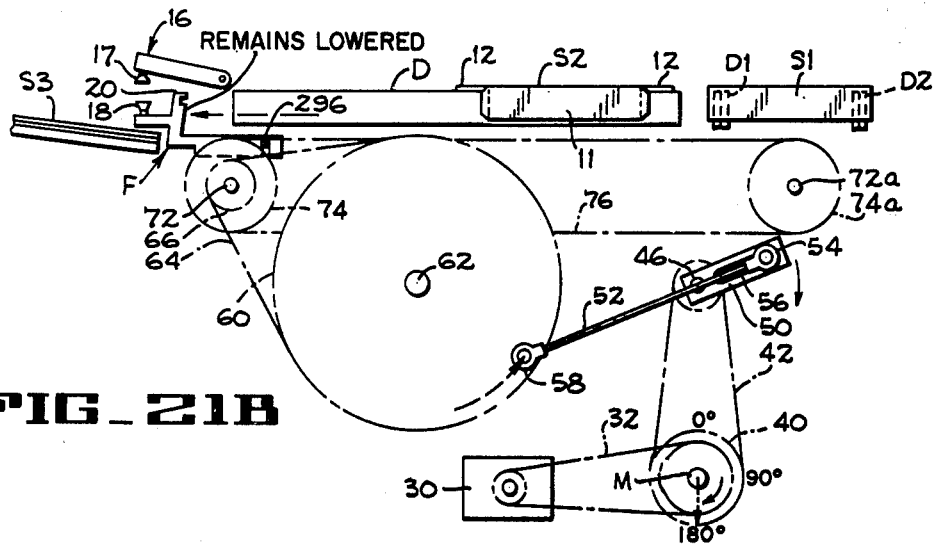
FIG_21B

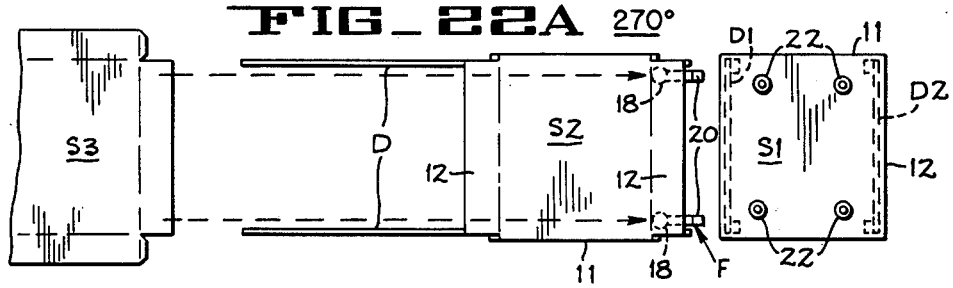

FIG_22A 270°

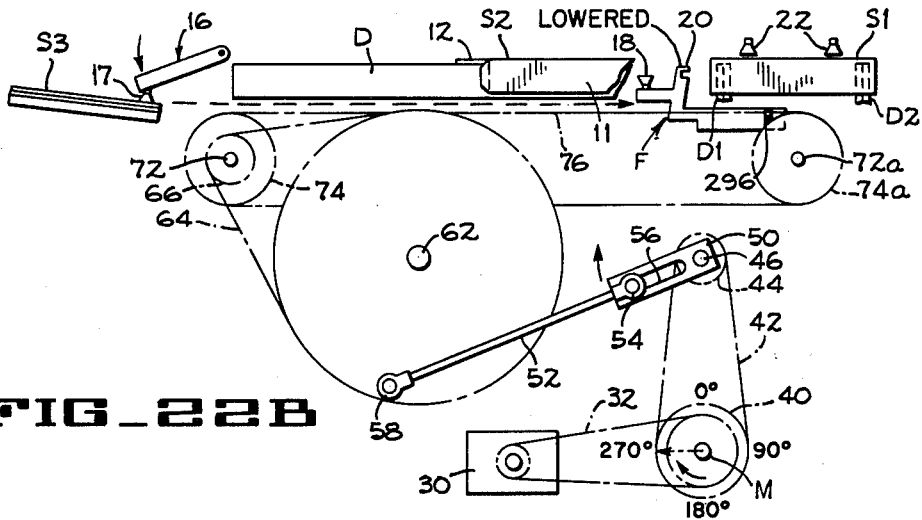

FIG_22B

FIG_23
TABLE-1

| MAIN SHAFT M | CRANK SHAFT 46 | PICK UP ARM 110 | FEEDER SHUTTLE 294 | LONGITUDINAL FOLDING DIES U | TRANSVERSE FOLDING DIES U1,U2 |
|---|---|---|---|---|---|
| 0° | 0° | UP | RETRACTED, RAISED | OPEN | OPEN |
| 90° | 180° | UP | ADVANCED, RAISED | OPEN | OPEN |
| 92° | 184° | UP | LOWERED, RETRACTING | OPEN | OPEN |
| 165° | 330° | UP | LOWERED, RETRACTING | CLOSES | CLOSES |
| 180° | 0° (360°) | UP | LOWERED, RETRACTED | CLOSED | CLOSED |
| 270° | 180° (540°) | DOWN | LOWERED, ADVANCED | CLOSED | CLOSED |
| 270°+ | 180°+ | RAISING | LOWERED, RETRACTING | OPENING | OPENING |
| 0° (360°) | 0° (720°) | UP | RETRACTED, RAISED | OPEN | OPEN |

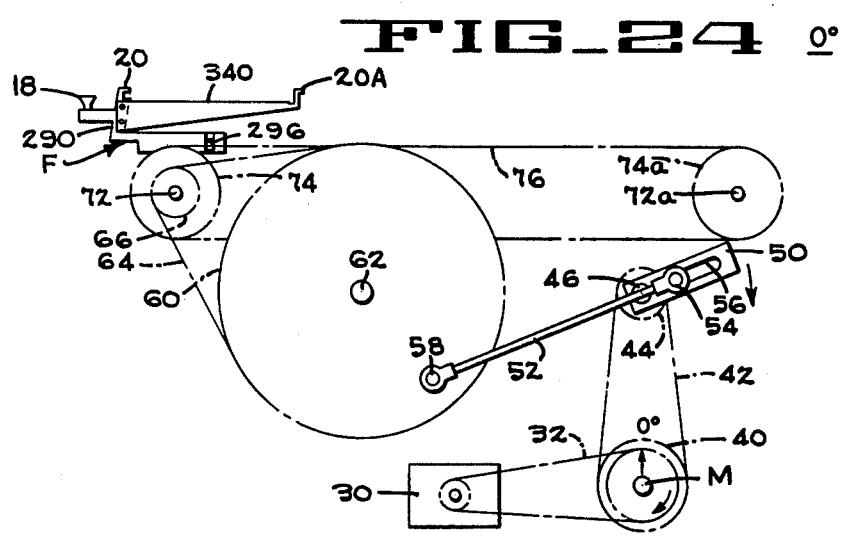
FIG_24 0°
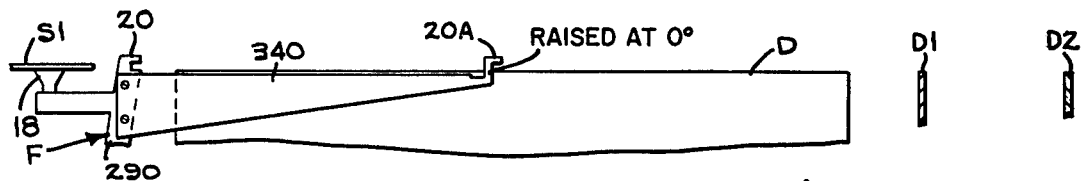
FIG_25A 0°
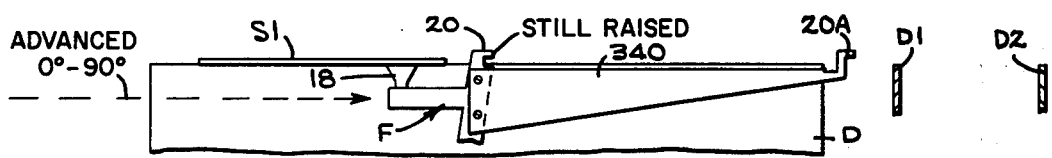
FIG_25B 90°
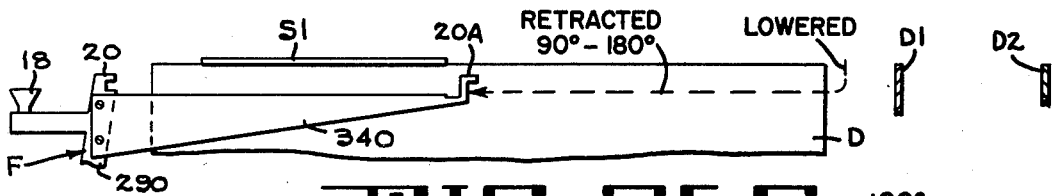
FIG_25C 180°
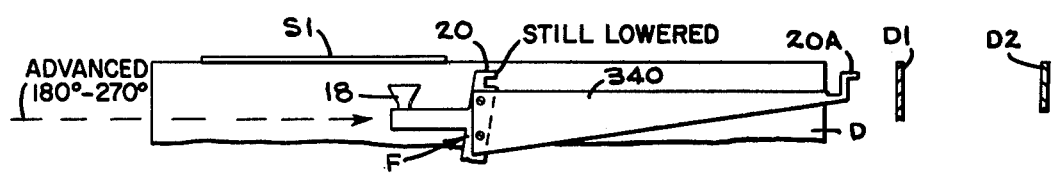
FIG_25D 270°

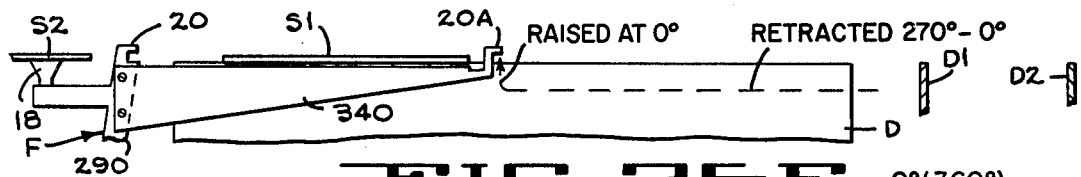
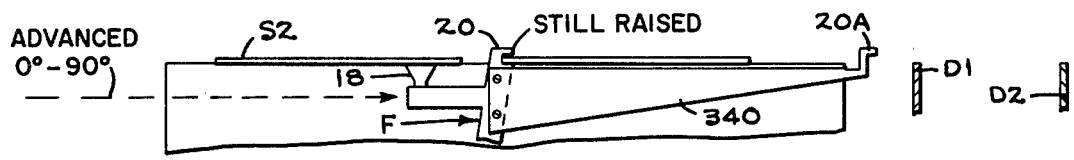
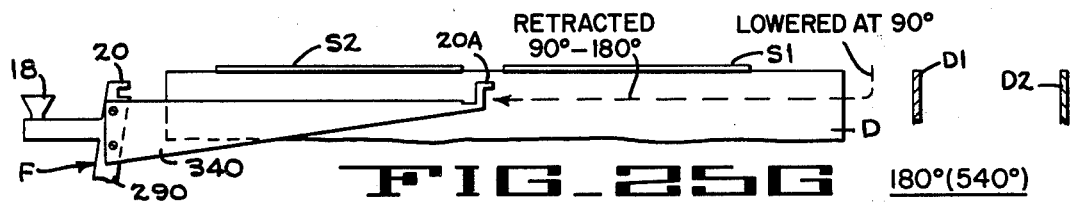
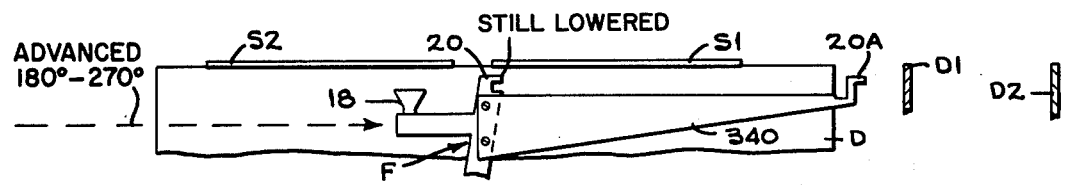
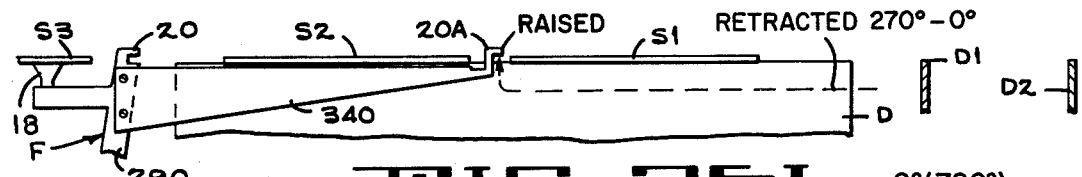
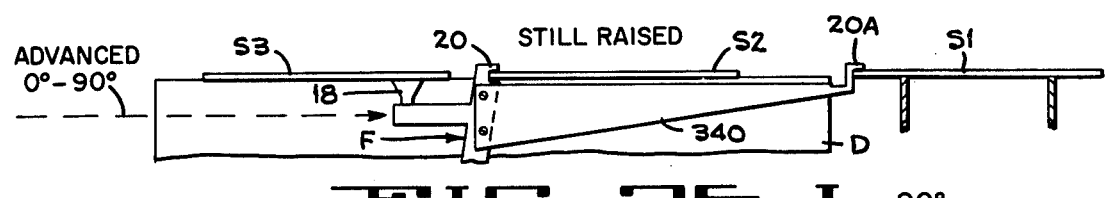

FABRICATION OF BOX PARTS FROM PLASTIC MATERIAL

This is a division, of application Ser. No. 570,903 filed Apr. 23, 1975 now U.S. Pat. No. 3,977,307.

DESCRIPTION OF PRIOR ART

The apparatus of the Crathern et al U.S. Pat. No. 3,259,030, issued July 5, 1966 and assigned to the FMC Corporation manufactures box parts from sheet material blanks forms of a thermoplastic material. Typical synthetic plastic materials of this character include cellulose acetate, plasticized polyvinyl chloride and copolymers thereof, polystyrene, a copolymer of styrene and acrilonitilre, etc. These materials can be softened for bending by the application of heat and can be joined by the application of heat and solvent applied to tabs or the like prior to the joining operation.

The apparatus of the aforesaid patent includes a pair of laterally spaced, longitudinally extending lower dies which support notched blanks or sheets of the plastic material. The sheets are fed by a feeder mechanism to a position below cooperating folding dies which close on the lower longitudinal dies and bend down end panels of the sheets. The partially folder sheets are then slid off the longitudinal dies onto and spanning a pair of longitudinally spaced transverse dies. At the latter dies, tab folding mechanisms at each corner apply solvent to and bend in the tabs projecting from the end panels of the sheets that were bent down on the longitudinal dies. Thereupon, cooperating transverse folding dies close on the transverse lower dies and bend down the side panels for joining with the solvent coated tabs. Tuck plates press the side panels against the tabs for completing the joint, whereupon the completed box part is lifted clear of the transverse die assembly and removed from the apparatus.

In the machine of the aforesaid patent 3,259,030, feeding mechanism is provided wherein the notched sheets or blanks are fed from an idle station near one end of the longitudinal dies to a forming station farther along those dies. Simultaneously the feeding mechanism slides a partially folded sheet from the longitudinal dies over onto the transverse dies as described. This feeding mechanism is actuated by a cam mounted on a one revolution per cycle main drive shaft, which cam oscillates motion-magnifying levers that advance and retract the feeder. The cam is steeply contoured so as to fully advance the feeder during only 90° of main shaft rotation, in order that the remaining 270° of main shaft rotation are available for forming and completing the box part.

As to the tab folding mechanism of the aforesaid patent, at each corner of the box-like assembly formed by the transverse lower dies in mounted a pivoted solvent applicator and tab folding mechansim. As these mechanisms are advanced towards their respective corners, they first clamp the depending end panels against anvils disposed at the ends of the transverse lower dies. Immediately thereafter, a combined solvent applicator and tab folder plunger engages each tab projecting from the folded down end panels, applies solvent thereto and bends the tabs 90° along the associated lateral dies. As mentioned, this operation is followed by bending down the end panels against the solvent coated tabs.

The tab folder plungers of the aforesaid patent include vertical solvent applicator bars which mount porous, sintered bronze solvent applicators. A drip bottle is associated with each plunger to feed the sintered bronze applicator with solvent. There is no recovery system for excess solvent.

SUMMARY OF THE INVENTION

The box making machine of the present invention is an improvement over that of the aforesaid Crathern et al U.S. Pat. No. 3,259,030. One feature of the present invention relates to improvements in the blank or sheet feeding mechanism. Machines previously manufactured by the assignee of the present invention embodied the cam and lever arm feeding mechanism employed in the aforesaid Pat. No. 3,259,030. As mentioned, the cam is mounted on the main drive shaft and is contoured to fully advance the feeder during only 90° of main shaft rotation. Experience with such machines showed that the maximum feeding speed attainable smoothly and without flutter was about 150 feet per minute. Furthermore, it was found that the maximum stroke length which would provide a staisfactorily smooth feeding action was about 15 inches. This limited the machine to a maximum blank width of about 14 inches at a maximum output of about 30 boxes per minute. The maximum width of the completed box part under these conditions was about 11 inches.

It was desired to extend the range of the aforesaid machine by increasing the maximum employable blank or sheet size while maintaining the previous production rate of box parts. For example, it was found that if the feed pusher travel could be increased to a stroke of about 27 inches, the new maximum blank width could be about 24½ inches. However, it was decided that the cam and lever type feed characteristic of the prior machine, wherein the cam is mounted on the main drive shaft, would not satisfactorily provide the extended stroke required for the larger blanks, wherein the pusher must travel at a rate of about 250 feet per minute during only 90° of cam rotation by the main shaft. Accordingly, the feed mechanism of the present invention is operated by feeder drive mechanism that is driven at twice the speed of the main shaft. This makes 180° of shaft revolution available for the feeding stroke, but as will be seeen it also requires that the feed mechanism be designed to partake of a complete idling stroke.

If the feeder were advanced by a cam driven at twice the speed of the main shaft, the contour of such cam would be only half as steep as that of a main shaft cam. However, since 180° of shaft rotation is available for advancing the feeder under the present invention, the preferred drive is by means of a crankshaft and connecting rod assembly, driven at twice the speed of the main shaft. Such an assembly provides smooth operation over a relatively long stroke because the parts operated by the crank and connecting rod assembly partake of simply harmonic motion. The feeder parts accelerate smoothly from zero velocity at zero degrees of the crank mechanism (when the crank and connecting rod are aligned) up to a maximum velocity at 90° of the crank mechanism. The parts then de-celerate smoothly from the maximum velocity at 90° to zero velocity at the 180° position of the crank, wherein the crank and connection rods are again in alignment.

As the machine of the aforesaid prior patent, mechanism is provided to lower the blank pushers during their retraction stroke in order that they will pass beneath and clear blanks disposed on the longitudinal dies. In the machine of the present invention, the pushers are also lowered during retraction after the feed stroke so that the lowered pushers are fully retracted after 360° of rotation of the crankshaft, which represents only 180° of rotation of the main drive shaft. This leaves 180° additional rotation of the main drive shaft that must be utilized for bending and other operations on the blanks before the next feed cycle is initiated. Thus, in accordance with the present invention, the feed mechanism is retained in its lowered position and advanced and retracted in that position during a second, or idling 360° cycle of the crankshaft, which cycle occupies the second 180° of main drive shaft rotation (180° – 360°). When the main drive shaft returns to its 0° position it will have completed 360° of rotation, 0° to 90° of which performed the blank feeding operation. At 0° of the main drive shaft the pushers will have been fully raised, so that during the next 0° to 90° rotation of the main drive shaft the pusher perform a new set of feeding operations.

In the preferred feeding mechanism of the present invention, the smoothly accelerating and decelerating crank motion just described is converted into oscillating motion of a large sprocket wheel. This sprocket wheel drives a pair of feed chains which have upper reaches that extend longitudinally along the longitudinal dies, which reaches are reciprocated. Each chain has a pin and sliding key assembly that advances and retracts a shuttle connected to one of the two feeding devices. Thus the shuttle is linearly oscillated in the horizontal plane and in order to accommodate raising and lowering of the shuttle (and the pushers) a vertically sliding connection is provided between the shuttle and the key on the chain.

Each shuttle slides along a longitudinally extending guide bar. Cam and lever mechanism, operated by the longitudinal cam shafts that flank the die assemblies, is provided for raising and lowering each shuttle guide bar. This provides means for raising the shuttle and the feeders associated therewith for feeding and for holding the shuttle in its lowered position, not only during retraction after feeding but also during one full advance and retraction or idle stroke of the feeder, as previously described.

Although the machine of the present invention is adapted to handle a large size blank than that of the aforesaid patent, it can be adapted to accommodate the handling of blanks smaller than the maximum size of which the machine is capable of handling, which adaptation will be referred to as "double stroke" operation. The pusher mechanism of the present invention is adapted for double stroke operation by bolting an extension, having an auxiliary pusher finger, to the support for each of the main pusher fingers. When this adaptation is made, the effective stroke of the crank is reduced by clamping the connecting rod to the crank at a point substantially midway along its length. This reduces the linear oscillating stroke of the pushers to about half of the stroke provided with full amplitude crank single stroke) operation. When operating in the double stroke mode, two blanks are resting on the longitudinal dies during retraction of the feeder. During the feeding operation, the forward or auxiliary pusher slides the leading blank onto the transverse dies, as the main or regular pusher advances the trailing blank on the longitudinal dies to a forward position thereon. Thus, by shortening the pusher stroke in the manner just described, and by adding an extension with an auxiliary pusher, the machine is capable of handling small blanks as well as large blanks. The principle of a full idle advance and retraction stroke during the second period of 180° rotation of the main drive shaft, previously described, is also employed when the machine is adapted and adjusted for "double stroke" operation.

Another feature of the present invention relates to the solvent applicator bar in the tab bending units. As mentioned, the corresponding units of the previous machine employed porous sintered bronze applicators and the solvent was supplied individually to each applicator by a drip bottle that fed solvent to a chamber behind each sintered bronze strip, The solvent applicator of the present invention does not employ a porous applicator bar. The solvent is flowed smoothly down the face of a solid applicator strip along a plurality of fine, parallel vertical grooves. The solvent is directed to an upper portion of the bar and flows down along the face of the applicator strip, guided by the aforesaid grooves. This provides a uniform, non-plugging application of solvent. In order to avoid dripping of solvent onto the machine and to facilitate recovery and recirculation of the solvent, solvent catcher cups are fitted to the lower ends of the applicator bars. Also, the individual drip bottles are replaced by a single, centralized solvent circulation and recovery unit. Preferably, this unit is in the form of a five gallon reservoir which can be placed in any convenient position adjacent the machine. The reservoir mounts a centrifugal pump which draws solvent from the reservoir and directs the solvent to a manifold from which depend four venturi type aspirator tubes that return solvent to the reservoir. A restricted venturi throat in each aspirator tube is connected by flexible tubing to one of the solvent recovery cups at the bottom of each solvent applicator bar. Thus, any excess solvent which flows down through the grooves along the face of the bar is recovered and returned to the reservoir. Also connected to the aforesaid manifold is a branch line which leads to a manifold block having four flexible solvent delivery tubes. One of these tubes is connected to each of the solvent applicator bars through an adjustable needle valve. By adjusting the needle valve in the line for each individual applicator bar, the correct amount of solvent is provided for properly wetting the tabs to be joined to the associated side panels of the box. No large excess solvent is permitted to flow down the applicator bars, but there is preferably a slight excess solvent flowing to insure wetting of the applicator bars along their length. This excess is received by the catcher cups, previously described, and is returned to the reservoir by the aspirator lines leading to the restricted venturi throats of the aspirator tubes.

When larger size box parts are formed, the thickness of the blanks or sheets is often greater than the thickness of the smaller sheets employed on previous machines. For example, the thickness range of the smaller sheet was in the order of 0.005 inches up to 0.010 inches. The machine of the present invention, when forming the large sheets, must be capable of forming thicker sheets, such as sheets having a thickness in the order of 0.015 inches. This increase in sheet thickness requires that the lower transverse dies be heated. When the lateral spacing of the longitudinal dies is adjusted in accordance with box dimension, the length of the transverse dies must be correspondingly altered to match the new lateral spacing of the longitudinal dies. If the transverse dies were to embody the conventional embedded, metal clad heating units the provision of sets of dies of different lengths would be relatively expensive because each die would require its own "tailor made" heating unit. In accordance with the present invention, instead of embedding specially fitted, metal clad heaters in the transverse dies, heaters are provided in the form of flexible, electrically heated rope-like elements. Simple aluminum clamp channels are provided to clamp a length of the rope-like heater element along each of the transverse dies and the remainder of the element merely droops down into the ambient air. However, it has been found that this mode of heating the lower dies is effective and only requires changing the length of the clamps to clamp the rope-like heating element to the dies, when a different length transverse die set is fitted.

As previously mentioned, the tab bending units includes clamps that grip the folded down end panels of the box againt clamp faces of anvils provided at each corner of the box-like structure formed by the transverse lower dies. With the heavier sheet material and with the somewhat increased amount of solvent applied with the machine of the present invention, the anvils are heated to facilitate tab bending and solvent drying. However, the heated anvils could soften the material beneath the clamps and cause sticking of the box part to the clamp faces of the anvils. This could destroy the appearance of the box part and render it difficult to remove the finished box part from the transverse die assembly. Under the present invention, the anvils are formed so that their clamp faces are insulated from the heated body of the anvil itself and the anvil surfaces that cooperate with tabs can reach a relatively high temperature for speeding up the drying of the solvent and for improving the joint at the tabs.

The feeding mechanism of the machine embodies cam actuated, vacuum cup lifter arm assemblies which raise the top blank from the stack for pickup by the vacuum cups of the feeder pushers. In accordance with the invention the longitudinal position of these assemblies, along with their stack guides, is adjustable, in order to extend the range of blank sizes that can be processed.

The manner in which these features are advantages of the present invention are attainable will be apparent from the following detailed description of the preferred embodiment of the invention.

BRIEF DESCRIPTION OF THE DRAWINGS

FIG. 1 is a diagramatic perspective showing the basic mode of operation of the apparatus.

FIG. 2 is a diagramatic perspective showing major elements of the apparatus.

FIG. 2A is a perspective of the adjustable feeder drive sprocket.

FIG. 2B is a front view of a blank pick up assembly.

FIG. 2C is a side view of the assembly of FIG. 2B.

FIG. 3 is a section showing the mechanism for operating one of the transverse dies.

FIG. 4 is a section showing the mechanism for operating one of the tuck plates.

FIG. 5 is a perspective showing a mechanism for operating one of the tab folders.

FIG. 5A is a diagram showing the accommodation of the heating element for a transverse die to variations in die lengths.

FIG. 5B is a section through the transverse die at a heating element.

FIG. 6 is a plan showing one of the tab folders clamping a panel against the anvil and applying solvent to a tab.

FIG. 7 is a view like FIG. 6, showing the tab bent over.

FIG. 8 is a view like FIG. 7, showing the tab folder retracted with a tuck plate advanced.

FIG. 9 is an enlarged plan view of an anvil.

FIG. 10 is an enlarged end view of one of the transverse dies and an anvil.

FIG. 11 is a side view with parts broken away showing mechanism for operating the blank feeder.

FIG. 12 is an end view of the blank feeder mechanism.

FIG. 13 is a fragmentary plan view of the blank feeder mechanism.

FIG. 14 is a diagram illustrating the solvent supply and recovery system.

FIG. 15 is an enlarged, partially sectioned view of a solvent applicator bar.

FIG. 16 is a front view of the applicator bar.

FIG. 17 is a top view of the applicator bar.

FIG. 18A – 22B are diagramatic views showing operation of the feeding mechanism on a single stroke cycle.

FIG. 23 is a table illustrating critical positions of the parts of the feeder mechanism in either the single stroke or the double stroke cycle mode.

FIG. 24 is a side elevation of the feeder mechanism set up for double stroke operation.

FIGS. 25A – 25J are sequential operational diagrams of the feeder apparatus during double stroke operation.

PRINCIPLES OF OPERATION

FIG. 1 is a schematic diagram showing the general principles of operation of a box machine embodying the present invention.

The basic mode of operation of the machine, when adjusted for "single stroke" operation, is illustrated in FIG. 1 and except for the presence of blank feeding mechanism, resembles that of the aforesaid Crathern et al U.S. Pat. No. 3,259,030.

Referring to FIG. 1, the blanks S1 – S3 are made of a thermoplastic material that can be softened by heat for bending and the parts thereof joined by using a solvent and pressure. preferably the blanks comprise synthetic (plastic) materials such as cellulose acetate, plasticized polyvinyl chloride and other materials that can be softened by heat and with a solvent, preparatory to sealing operation that is performed with the use of heat and pressure.

The blank S3, which is shown in its unfolded form in FIG. 1, provides a top panel 10, longitudinally extending end panels 11, laterally extending side panels 12 and tabs 13 projecting from the end panels 11. It is to be understood that the assignment of the terms "side" and "end" to the panels is purely arbitrary. Major elements of the machine include laterally extending spaced longitudinally extending lower dies D each die being supported by a channel iron table T, only one of which appears in FIG. 1. Longitudinally aligned with the dies D are longitudinally spaced, transversely extending lateral dies D1, D2 associated with vertically extending corner anvils A. Combined end panel clamps and tab folders P are associated with each anvil A.

At the front of the machine, a stack of blanks (not shown) supports a top blank or sheet S4. Vacuum cup blank pickup or lifting assemblies, indicated generally at 16, and having vacumm cups 17, are provided in order to raise the leading portion of the top blank S4 and present it to a blank feeding mechanism. The two synchronized feeding mechanisms, indicated generally at F are shown in broken lines at the S4 and mount vacuum cups 18 for withdrawing a blank from the stack.

Blank pushers 20 are provided on each feeder F.

The feeding mechanism F is illustrated in solid lines in FIG. 1, at which position the vacuum cups 18 have withdrawn an unfolded blank S3 from the stack and the pushers 20 are about to engage a partially folder blank S2 and slide it off the dies D onto the transverse dies D1, D2. It will be noted that the end panels 11 of the blank S2 have been previously folded down by upper die assemblies (not shown).

At the transverse die assemblies D1, D2, a completed box part S1 has been raised from these dies. The tab folders P in cooperation with their associated anvils A first folded the tabs 13 inwardly and applied solvent thereto. Thereafter upper transverse dies (not shown) folder the side panels 12 down against the tab 13 and tuck plates (not shown) pressed the side panels 12 against the underlined tabs 13. The completed box part S1 is raised from the transverse dies D1, D2 by an elevator, including suction cups 22 whereupon the box is ejected from the machine by an ejector, including longitudinally moving suction cups 24. As will be seen, the upper dies that cooperate with the longitudinal dies D and the upper dies that cooperate with the transverse dies D1, D2, the tuck plates and the box elevating and ejection mechanisms having corresponding elements in the aforesaid U.S. Pat. No. 3,259,030 and only enough of these structures will be described to facilitate an understanding of the invention. The nature of the completed box part elevating and ejection mechanisms is not critical to the invention, and in fact, the completed box part could be removed by hand.

As will be seen, features of the present invention relate to the blank pickup structure 16, the feeders F, the tab folders P, the anvils A, and means (not shown in FIG. 1) for heating the transverse dies D1, D2.

GENERAL ARRANGEMENT OF THE MACHINE

FIG. 2 is a diagramatic perspective showing the principle elements of a box machine embodying the present invention. In this view, many parts duplicated on opposite sides of the machine have been omitted and all parts are shown in highly simplified form. The operation of certain parts is like that of the aforesaid patent to Crathern et at U.S. Pat. No. 3,259,030 and although some of those parts will be described, such description will only be detailed enough to facilitate understanding of elements of the present invention which are not present in the patent. Thus, for additional details of parts not critical to the present invention, but which are illutrated generally herein and are included in the machine, reference is made to the aforesaid Crathern U.S. Pat. No. 3,259,030, which is incorpoted herein by reference.

As seen in FIG. 3, running along opposite sides of the machine are channel iron tables T. Each of these tables mount the longitudinal fixed dies D, previously described, and the transversely extending lower fixed dies D1, D2, also previously mentioned. The tables T are slidably supported on the frame of the machine by means of transverse rods $2^5$ and means (not shown) are provided to adjust the lateral spacing of the tables according to the length of the side panels 12 (FIG. 1). Another major element indicated schematically in FIG. 2 is one of four tuck plates 26 provided at each anvil A for pressing down the side panels 12 (FIG. 1) against the tab 13 after the latter have been bent over by the tab folders P and after the upper dies U1, U2 have bent the end panels 12, down against their associated tabs.

Mounted on each channel shaped table T is a master cam shaft K, one of which appears in FIG. 2. In operation of the machine, one cycle is completed upon one revolution of each cam shaft K so that a completed box part S1 (FIG. 1) is ready for removal from the machine after each revolution of the cam shafts K.

As indicated schematically in FIG. 2, each cam shaft K mounts a pair of cams C1 for raising and lowering the feeding assembly F in a manner to be described in detail presently. Each cam shaft also mounts a pair of cams C2 for raising and lowering the upper longitudinal dies U in order to bend down the panels 11. (See the blank S2 in FIG. 1). This mechanism is like that in the aforesaid patent and will be described in more detail in connection with FIG. 12.

Cams C3 on each cam shaft K operate the tab folders P which will be described in connection with FIG. 5. Cams C4 on the cam shaft raise and lower the transverse upper dies U1, U2 to bend down the side panels 12, as will be described in connection with FIG. 3. Also mounted on each cam shaft K is a cam C5 (not shown, but see FIG. 4) for operating the tuck plates 26 and a cam C6 for operating the blank pickup mechanism 16 (FIG. 10A)

SHAFT DRIVES

Referring again to FIG. 2, the mechanisms just referred to are driven from an electric motor 30 that drives a chain and sprocket assembly 32 that rotates a main shaft M. The manin shaft M (which makes one revolution per cycle) drives a chain and sprocket assembly 34 which rotates a cross shaft 36 at the rear of the machine. The cross shaft 36 is driven at the same speed as that of the main shaft M. The main shaft M also mounts a cam C7 which operates a multiple value 38 connected to a source of vacuum The valve 38 also operates as a manifold and draws the vacuum on the vacuum cups 17, 18 on the pick up and feeder mechanisms. The details of how the valve 38 times the vacuum source to the feeder and pickup vacuum cups are not critical to the present invention, although the basic mode of operation of these vacuum cup will be explained presently.

Returning to the cross shaft 36, each end of that shaft mounts a miter gear 40 which is splined to the shaft 36 so that the gears 40 can slide along the shaft as the spacing between tables T, which support the gears, is adjusted for blank size. The miter gear 40 at each end of the cross shaft 36 meshes wih the meter gear 42 on the associated end of the cam shaft K, but only one such gear assemblies appears in FIG. 2. Since the gears 40, 42 are miter gears, the cam shaft K makes one revolution for each revolution of the main drive shaft M, and hence for each cycle, as previously described.

This sliding miter gear construction is shown in detail in the aforesaid patent, and reference thereto is made for a suitable design.

FEEDER DRIVE

As previously mentioned, the feed mechanism F is reciprocated in simple harmonic motion by a crank and connecting rod mechanism that is driven at twice the speed of the main shaft M. In order to provide this drive, a sprocket 40 (FIG. 2) is keyed to the main shaft M. The sprocket 40 drives a chain 42 and a smaller sprocket 44 on a crank shaft 46. The smaller sprocket 44 has half the pitch diameter of the driving sprocket 40 so that the crank shaft 46 rotates at twice the speed of the main shaft M.

Keyed to the crank shaft 46 is a slotted crank 50 for providing a simple harmonic motion that drives the feed mechansim. A connecting rod 52 has one end 54 thereof clamped to the crank 50 by a suitable bolt and nut construction fitted in a slot 56 of the crank. They provide an adjustable effective throw of the crank, for conversion from "one stroke" to "two stroke" operation. The other end 58 of the connecting rod 52 is pivotally mounted on a large oscillating sprocket wheel 60 mounted on a shaft 62 that is supported in the frame. A chain 64 on the sprocket wheel 60 drives a small sprocket 66. As seen in FIG. 2A, the small sprocket 66 is formed with arcuate slots 68 and and the sprocket is adjustably clamped to a hub 70 by means of bolts 72 extending through the slots 68 and into threaded holes formed in the hub 70. The hub 70 oscillates a feeder chain drive shaft 72 in response to rotation of the crank 50 and oscillation of the sprocket wheel 60. Keyed to the drive shaft 72 is a sprocket 74 which reciprocates a chain 76, when the chain sprocket is oscillated by the sprocket wheel 60. As will be described in detail, the chain 76 advances and retracts the feed mechanism F. A companion sprocket and chain assembly 74, 76 not shown in FIG. 2) is mounted underneath the table T on the other side of the mechanism and the shaft 72 extends across the machine to drive the companion assembly.

Having described the basic elements of the machine in connection with FIG. 2, various elements thereof will now be explained in somewhat more detail.

BLANK PICKUP MECHANISM

The vacuum cup blank lifting or pickup mechanism 16 is provided for raising the top sheet from a stack of blanks so that the vacuum cups 18 on the blank feeding mechanism F can retract to a position underneath the top sheet prior to pulling the top sheet onto the longitudinal dies. In the apparatus of the present invention, the blank lifting mechanism 16 also supports the stack guide and stack elevating table and the entire assemblies 16 are adjustably mounted along the side channels T that mount the cam shafts K, previously mentioned. By making the aforesaid blank pickup assembly longitudinally adjustable, the apparatus can handle a wider variety of box blanks and particularly can be set for a variety in the depth of the side and end panels. This adjustment is especially useful when the machine is operated on a "double stroke" cycle of the pusher assembly, to be explained presently.

Referring to FIGS. 2B and 2C, one of the two blank lifting or pickup assemblies 16 is shown mounted on base structure 80 at the blank delivery end of the associated side channel T. The base structure 80 is keyed to the side channel by keys 82 to provide for longitudinal adjustment of the base and is clamped in its adjusted position by clamp bolts 84 (FIG. 2B).

Each base 80 mounts an L shaped stack guide 86. Vertically moveable between the stack guides is a stack supporting table 88 and mechanism well known in the art is provided for progressively raising the table 88 as sheets are removed from the stack theron. The details of the table raising mechanism are not critical to the present invention and hence are not described.

Although there are two of the blank lifting units 16, only one will be described. The cam C6 that operates the mechanism is integral with a hub 90 (FIG. 2C) and the cam and the hub are keyed to the shaft K by a key 92. The cam C6 and its hub are longitudinally slideable along the shaft K. As seen in FIG. 2C, the hub 90 is formed with spaced shifter flanges 94 which receive a shifter block 96 secured to the base structure 80 of the unit. Thus, when the base structure 80 and the stack guide assembly is longitudinally adjusted along the channel table T, the operating cam C6 for that structure will be shifted with the base structure.

In order to raise and lower the vacuum cup 17 of the pickup unit 16, a bell crank cam follower assembly is provided. As best seen in FIG. 2B, a cam follower roller 98 is mounted on an arm 100 of a bell crank which crank is provided to the base at 102 and has a laterally projecting arm 104. The arm 104 is pivoted to an adjustable length link 106, the upper end of which is pivoted to a plate 108 depending from a pickup arm 110. The pick up arm 110 is secured to a stub shaft 112 which is pivotally mounted in a post 114 projecting from the base 80. A spring 116 (FIG. 2C) urges the arm 110 towards its lowered position. Thus, when the shaft K rotates, the cam C6 will raise and lower the pickup arm 110 and the cam C6 is contoured and timed so that this action will lift the top sheet from the stack and have it ready for retraction of the feeding mechanism F to position the vacuum cups 18 below the leading edge of the top sheet.

The vacuum cup 17 of the pickup unit is connected by a flexible hose 120 to the vacuum valve 38 shown in FIG. 2. The vacuum cup 17 is mounted so that it can automatically align itself with the top sheet on a table 88. In order to provide this self-aligning action, the vacuum cup is mounted on a laterally extending arm 117 which has a stub shaft 118 (FIG. 2B) that is freely rotatable in a bushing 119 secured to the outer end of the arm 110. A clip 121 (FIG. 2C) supported by the arm 117 assists in aligning the vacuum cup 17 with the top sheet in the stack of sheets.

LONGITUDINAL UPPER DIES

The mechanism for operating the longitudinal upper bending dies U is like that in the aforesaid patent and will only be described briefly. FIG. 12 shows the mechanism at one side of the machine, it being understood that there is a companion mechanism at the other side. In FIG. 12, each upper die U is mounted on rocker arms 122 which are pivotally mounted at 124 on posts 126 projecting upwardly from the channel T. The rocker arms 122 mount cam follower rollers 128 which are urged into engagement with the two cams C2 on the shaft K by means of a spring assembly 130. Also appearing in FIG. 12 is a side support channel 132 for the associated end panel 11 of the blank. As in the foresaid patent, when the longitudinal upper dies U are lowered by the action of the cams C2, the end panels 11 of the blank are bent down against the longitudinal dies D. It is noted that the dies D are heated by heating elements 134, as in the aforesaid patent.

TRANSVERSE UPPER DIES

The transverse upper bending dies U1 and U2 are also operated in the manner described in detail in the aforesaid patent. FIG. 3 shows structure for operating one end of the inboard transverse die U1. The operating structures for the outboard die U2 is similar except that they are mounted on longitudinally adjustable bases for accommodating various longitudinal blank dimensions, as described in detail in the aforesaid patent.

Referring to FIG. 3, one of the cams C4 that raise and lower the inboard transverse die U1 is shown mounted on the cam shaft K. Various bearings are provided for mounting the cam shaft K on the associated table T, as disclosed in the foresaid patent, but these design details are not critical to the present invention.

Referring again to FIG. 3, a cam follower roller 140 engages the cam C4 and the roller is mounted on an arm 142 of a bell crank which crank is pivoted at 144 to a block 146. The block 146 is spring mounted on the table T by springs 148 which act as a pressure relief mechanism in case obstructions are encountered. The other arm 150 of the bell crank is pivotally connected at 151 to a vertical link 152. The link 152 is pivoted at 153 to one of the arms 154 that mount the inboard upper bending die U1. Each arm 154 has a stub shaft 156 which is pivotally mounted in an eccentric bushing 158. This bushing is clamped in a post 160 that projects upwardly from the table T and provides for a fine adjustment of the relative position of the upper die U1 and the transverse lower die D1. The upper die U1 is heated by an electric heating element 162. The cam roller 140 is urged against the cam C4 by a spring 164 that has one end mounted by means not shown on the Table T and the other end connected to an arm 166 that is keyed to the pivot shaft 144 for the bell crank. As in the case of the longitudinal upper dies U1, U2 are raised during the 90° of cam shaft rotation which takes place during the blank feeding operation.

TUCK PLATES

As in the aforesaid patent, tuck plates are provided along the side surface (tab receiving) of each anvil A to press the side panels 12 against the solvent coated tabs 13 after the tabs have been folded by the tab folders P and the side panels have been bent down by the transverse dies U1, U2. One of the tuck plates is indicated at 26, (FIG. 2) and operates in conjunction with the inboard transverse dies U1, D1. Other tuck plates 26a operates in conunction with the outboard transverse dies U2, D2 and one of these appears in FIG. 5.

FIG. 4 illustrates the mechanism for operating the inboard tuck plate 26 and similar mechanism is employed for operating the outboard tuck plates, as described in detail in the aforesaid patent. Referring to FIG. 4, the tuck plate cam C5, keyed to the cam shaft K, operates a roller 150 that is mounted on a cam follower arm 151. This arm is pivotally mounted at 152 to a plate 153 secured to the associated side channel T. In order to transmit motion of the cam follower roller 150 to the tuck plate, a link 154 is mounted by a swivel joint 155 on the free end of the cam follower arm 151. The other end of the link 154 is pivoted by a swivel joint 156 to a short longitudinally extending crank 157. The crank 157 is secured to a rock shaft 158 which extends beneath the table T. The inner end of the rock shaft 158 mounts the hub 159 of an upwardly extending arm 160 and the tuck plate 26 is secured to this arm.

Also mounted on the rock shaft 158 is a retractable sheet guide 162 secured to the upper end of an arm 163 that oscillates with the rock shaft. A longitudinally extending spring 164 connects between a spring post 166 fixed to the table T and a depending arm 165 secured to the rock shaft 158. This spring causes the cam follower 150 to follow the contour of the cam C5. The details of this structure are not critical to the present invention and are explained fully in the aforesaid patent.

TAB FOLDERS

Before the tuck plates, just described, press the side panels 12 against the solvent coated tabs 13, the tab folders P previously mentioned bend the tabs in along side faces of the anvils A. The mechanism for operating one of the outboard tab folders P appears in FIG. 5 and although the solvent applicator bar and the anvil structure have been improved, the operating mechanism for the tab folder is like that of the aforesaid patent. The outboard tab folders P and the associated upper and lower dies U2, D2 are mounted for longitudinal adjustment along the supporting channel tables T in order to accommodate variations in blank dimension.

Referring to FIG. 5, the operating structure of the tab folder P is mounted on a base 170 which can be adjustably positioned along the table T, as described in detail in the aforesaid patent. The structure is operated by the cam C3 which is keyed to but slidable along the cam shaft K, as is also described in detail in the aforesaid patent. Details of these operating structures are not critical to the present invention.

The cam C3 operates a cam roller 172 secured to one arm 173 of a double bell crank lever which is pivotally supported at 174 on the base 170. An upright arm 175 of the bell crank lever mounts one end of a link 176 and the other end of the link is connected to an arm 177 of a T-shaped solvent applicator bar 178. The arm 177 of the T-shaped applicator bar is slidably mounted in a pivot block 180 and the block 180 is pivotally mounted by an adjustable eccentric pivot 182 to an upright 183 projecting from the base structure 170. The pivot structure 184 appearing in FIG. 5 mounts one end of the associated out-board upper bending die U2, as is explained in detail in the aforesaid patent. An outboard tuck plate 26a also appears in FIG. 5.

FIGS. 6 –8 show additional structure and illustrate the operation of the tab folder P. As seen in FIG. 6, the T bar 177, connected to the link 176 and projecting from the vertical solvent applicator and tab bending bar 178, is recessed to receive a spring 186. This spring is pinned to the T bar 177 at 187 and to the block 180 at 188.

In operation, the link 176 first brings a clamping face 190 of the block 180 against the end panel 11 of the blank (which was bent down by one of the longitudinal folding dies U) which panel is backed up by a clamp face 192 of the anvil A. The clamp face 192 of the anvil A is best seen in FIG. 9 and as will be explained presently, it is insulated from the heated body of the anvil. When the bar 178 engages the flap 13, it applies solvent to the flap in a manner to be described. in detail presently.

As seen in FIG. 7, further advance of the bar 177, by the operating mechanism previously described, projects the combined tab bending and solvent applicator bar 178 from within its recess 193 in the block 180. This bends the tab 13 against a heated side face 194 of the anvil A.

In FIG. 8, the tab folder P is then retracted and the side panel 12 is bent down by the associated upper folding die U1 and U2 (not shown) in a manner previously described and explained in the aforesaid patent. Thereafter, the tuck plate 16A presses the side panel 12 against the solvent coated tab 13 and this action, coupled with the heating of the anvil A, completes the joint.

TRANSVERSE DIE HEATERS

Since the apparatus of the present invention can handle larger and thicker blanks than that of the aforesaid patent, it has been found desirable to supply heat to the lower transverse dies D1, D2 of the machines. It will be recalled that spacing of the table T that support the dies is adjustable for accommodating variations in the transverse dimensions of the body panel 10 of the box parts. Such adjustment necessitates the provision of transverse lower dies D1, D2 having various lengths. If conventional, metal clad heating elements were provided for these dies, each length of die would have to be provided with its individual element, thereby increasing the cost of changing dies. In accordance with the present invention, the same heating element can be applied to all of the transverse dies regardless of their length.

Referring to FIGS. 5, 5A and 5B, it can be seen tht a heating element 200 is clamped near the upper edge of the lower die D2 by a channel shaped clamp 202 screwed to the face of the die which will be inside the completed box part. The heating element 200 is formed of a flexible rope-like heating element having a braided fiberglass covering, and having electrical leads extending from the heating element. A length of the heater element is clamped to the die by the channel 202 just described with the channel and element extending the full length of the die. The remainder of the heating element merely drapes down into the atmosphere. Referring to FIG. 5A, the leads (unheated) 203 are covered with a flexible insulating tubing and the free end thereof mounts a plug 204 for connection to a source of electrical energy. As indicated in broken lines in FIG. 5A, when a different length die D2 is provided, all that is necessary is to cut a corresponding length of the channel 202 for clamping the flexible heating element to the die. The remainder of the heating element merely drapes into the atmosphere as previously described. Preferably, the length of the heating element 200 will be in the order of 24 inches, which is more than enough to accommodate the longest die to be employed. The leads 203 are 30 inches long. Although some of the heating element 200 will be exposed to the atmosphere, the heating effect on the die is adequate.

Heating elements of this type are manufactued by Hotwatt, Inc. of 128 Maple Street, Danvers, Mass., as their "High Temperature Glasrope Heater". The heating element described herein operates at 230 volts and draws 190 watts.

THE HEATED ANVIL

Detail of the heated anvil A, previously mentioned in conjunction with FIGS. 6 – 8, are shown in FIGS. 9 and 10. The anvil comprises a steel body 210 having bosses 208 (FIG. 10) that are mounted on vertical anvil support bars 212 by screws 214, one of which appears in FIG. 10. The vertical bars 212 also mount the associated transverse lower dies, D1 or D2. The upper end of the anvil body is bevelled at 215 (FIG. 10) to receive a triangular end portion 211 of the associated lower die D1. As shown in FIG. 10, the die D1 projects slightly above the upper end of the associated anvil.

The tab is bent against a side face 194 of the anvil, which face is offset from the body 210 of he anvil. As seen in FIG. 9, an electric heating element 216 is clamped by tapered screws in a groove formed in the body 210 of the anvil for supplying heat to the body 210 and hence to the side face 194 of the anvil body. This heat facilitates bending of the tab and the softening thereof by the solvent supplied by the solvent applicator bar 178.

As previously mentioned, the clamping face 192 of the anvil is insulated from the heated body 210 thereof. The clamping face 192 of the anvil is provided by a strip of metal 218 having a high heat conductivity, such as aluminum. The strip is generally L-shaped to provide a freely projecting cooling fin 219. An insulator 220 is provided between the strip 218 and the body 210 of the anvil. In the form illustrated, this insulator is made of wood. In order to further reduce the conduction of heat from the heating body 210 to the clamp strip 218, the clamp strip is secured to the body 210 by insulated fasteners, such as nylon screws 222. It will also be noticed that the screws 222 also secure the insulator strip 220 to the anvil body. With this construction, the body 210 and the side face 194 of the anvil can be brought to a temperature of about 200° F or higher, which temperature is sufficiently high to facilitate bending of the tab, softening of the tab by the solvent and drying of the solvent before the finished box part is removed. Because of the insulation and cooling fin construction, during operation the clamp face 192 of the anvil will be at a a temperature of about 150° F, which is cool enough to prevent sticking of the side panel 11 against the anvil face 192 under the action of the clamp face 190 on the tab bender block 180.

SOLVENT APPLICATOR BAR

The combined tab folder and solvent applicator bar of the present invention represents an improvement over that of the aforesaid U.S. Pat. No. 3,259,030 in that is does not employ a porous solvent applicator which might be subject to clogging. In accordance with the present invention, the applicator bar is provided with a solid metallic applicator strip, the face of which is vertically grooved and solvent is directed down along the grooves for spreading over the face of the applicator strip upon contact with the tab. Also, a solvent recovery cup is provided at the bottom of the bar.

FIGS. 15 – 17 show details of the improved applicator bar. The bar 178, which is about four inches long, has a tab engaging face is vertically grooved at 230,231 (FIG. 17) which grooves flank a strip having an inclined solvent applicator face 232. The face 232 is inclined to facilitate wiping of the solvent onto the tab 13. Two small, V-shaped vertical grooves 233 are machined in the applicator face 232 for directing the flow of solvent down along the base. The upper end of the bar is notched at 234, as best seen in FIGS. 15 and 16, for conducting solvent to the groove 233.

Solvent is directed to the applicator bar from a solvent inlet hose 236 (FIG. 16) which receives solvent in a manner to be explained in conjunction with the system of FIG. 14. A nipple 238 conducts the solvent to a drilled metering passage 240 (FIG. 15) which communicates with a small angled passage 242 that leads to the aforesaid notched surface 234. Thus solvent entering the hose 236 flows upwardly through the drill passage 240, through the small slanted metering passage 242, down the notch 234, and down the vertical grooves 233. Since the solvent has relatively low surface tension, it will flow across the face 232 of the applicator trip and will be wiped onto the tabs 13, as previously described in connection with FIG. 6. In a preferred embodiment, the face 232 of the applicator strip having the vertical grooves 233 is inclined at about 15° and is about 5/32 inches wide. The grooves 233 are about 0.005 – 0.008 inches deep.

A solvent recovery system is also provided, as will be explained in connection with FIG. 14. Referring to FIGS. 15 – 17, solvent flowing down the grooves 233 is caught by a cup 245 made of sheet metal. The bottom flange 246 and the side flange 247 of the cups are silver soldered to the bar 178. The lower end of the bar 178 is milled out at 248, to provide a notch that cooperates with the cup 245 to provide a solvent recovery pocket, best seen in FIG. 15. The solvent is aspirated back a central reservoir through a return line 249 which communicates with the pocket formed by the notch 248 below the level of the cup 245. Since the solvent applicator bar just described requires no felt or sintered porous metal applicators, clogging problems are not present. Also, since excess solvent is caught by a cup at the bottom of the bar it does not drip into the associated machine parts and hence does not require occasional clean up.

SOLVENT RECOVERY SYSTEM

Instead of requiring separate drip bottles for supplying solvent applicator bars, as in the aforesaid patent, a centralized solvent and recovery system is provided, as illustrated in FIG. 14. Referring to that figure, one of the four applicator bars 178 is shown connected to the solvent system. Of course, the other four bars are similarly connected, but these bars do not appear in the figure.

A solvent reservoir 250 is provided which may be a five gallon can and which can be placed on the floor in a convenient location at the machine. The reservoir 250 is provided with a lid 252 which lid mounts an electric motor 254 having a shaft 256 that extends into the reservoir and drives a pump impeller 258. The impeller housing 260 is supported from the lid 252 by a depending tub 262. The impeller housing 260 has a solvent inlet 264 and a solvent delivery line 266.

The solvent delivery line 266 from the pump leads to a dual purpose manifold. The manifold includes a pipe cross 268, nipples, two pipe tees 270 and two street elbows 272. Projecting down from these fittings are four aspirator units, each of which includes a venturi 274 connected to a discharge pipe 276 that returns the solvent to the tank. The restricted throat of each venturi is connected to the flexible hose solvent recovery lines 249, previously described, for picking up excess solvent from the cups 245, best seen in FIG. 15.

Most of the solvent circulated by the pump flows through the venturis 274 to create a sub-atmospheric pressure in the line 249 for withdrawing excess solvent from the applicator bars 178. However, some of the solvent is pumped from the pipe cross 268 to a solvent delivery line 278 which connects to a four way manifold block 280. The block 280 has four outlets 282, each of which connects to a needle valve flow regulator 284 and each of these regulators, in turn, directs a controlled amount of solvent to the lines 236 leading to the applicator bars 178, as previously described.

In operation, the motor 254 drives the pump rotor 258 and a majority of the pumped solvent is forced through the venturis 274, creating a negative pressure in the lines 250 and withdrawing excess solvent from the cups 245 as previously described. However, a minority portion of the pumped solvent is forced through the manifold block 280, the needle valves 284 and up to the applicator bars, as previously described in connection with FIGS. 15 – 17. The needle valves 284 are adjusted so that enough solvent is provided to wet the tabs 13 of the blank without causing the catcher cups 245 to overflow With this system, solvent does not flow down into the machine even though a slight excess of solvent is delivered to the applicator bars.

Blank FEED MECHANISM DETAILS

FIGS. 1 – 13 illustrate details of the blank feeding mechanism F, previously mentioned briefly. Only the mechanism on one side of the machine will be described, it being understood that the mechanism on the other side of the machine is a duplicate. The vacuum cup 18 for pulling blanks from the stack and the pusher 20 for pushing blanks along the longitudinal lower dies D are mounted on a post 290 which projects upwardly from the horizontal bar 292 which bar is mounted on a shuttle 294. The shuttle 294 is both reciprocated and lowered and raised by mechanism now to be described in detail.

As previously described in connection with FIG. 2, a shaft 72 for the sprocket 74 of a chain 76 is oscillated by a crank and eccentric sprocket wheel mechanism. This oscillation of the chain drive shaft 272 causes reciprocation of the upper reach of the chain 76 and hence causes reciprocation of a chain pin extension 296. A shuttle drive key 298 is mounted on the chain pin 296, and rides in a groove 299 (FIG. 13) in the shuttle 294. FIG. 11 also shows an idler sprocket 74a mounted on a shaft 72a for the chain 76.

The shuttle 294 is reciprocated along a longitudinally extending guide bar 300 which can be raised and lowered. The guide bar 300 is supported by diagonally upwardly projecting posts 302 (FIG. 12) threaded into a downwardly inclined longitudinal guide flange 304. The shuttle has a depending arm 306 mounting guide pads 307 (FIG. 12) which flank the guide flange 304 and maintain the feeder bar 290 in a vertical position, on the bar 300, all as best seen in FIG. 12. Thus with the construction just described, reciprocation of the chain pin 296 (FIG. 11) and the key 298 thereon will reciprocate the shuttle 294 and hence will reciprocate the vacuum cup 18 and the pusher 20.

As previously mentioned, it is also necessary to lower the elements 18, 20 during the first retraction of the feeder after a feed stroke and during one complete advance and retraction cycle that follows the feed stroke. As previously mentioned, raising and lowering of the feeder is accomplished by the cam C1 on the cam shaft K. The cam C1 is contoured so that the feeder is raised for feeding during the first 90° of rotation of the cam shaft K and of the main shaft M (FIG.

2) and the feeder is then lowered during the remaining 270° of rotation of those shafts, during which time the feeder is retracted and then advanced and retracted.

In order to raise and lower the feeder, a cam roller 310 (FIG. 12) is operated by the cam C1 and reciprocates push rod 312. The upper end of the rod 312 mounts a fork 314 which rides in a slotted bushing 316 on the cam shaft K thereby stabilizing the push rod 312. The lower end of the rod 312 is pivoted at 318 to a shuttle lifting lever 320. The lever 320 is pivoted at 322 to a square post 324 which depends from the channel table T. The post 324 is notched at 326 (FIG. 12) and mounts a vertical slide rod 328. Slidably mounted on the rod 328 is a slide box 330 which has a pin 332 that is received in a notch 333 formed in the free end of the shuttle lifting lever 320. A spring 334 connected between one end of the lever 320 and to the channel T urges the cam follower 310 against the cam C1. It can thus be seen that rotation of the cam C1 by the cam Shaft K will oscillate the lever 320 and raise and lower the lifting block 330, in the manner described. The depending posts 324 also mount upper and lower guides 336, 338 for the reciprocating chain 76. Thus, as the shuttle 294 is raised and lowered by the cam C1, although the shuttle driving key 298 is restrained from vertical motion by the upper chain guide 336, the groove 299 formed in the shuttle accommodates vertical motion thereof relative to the small key 298 mounted on the chain pin 296, as previously described.

As seen in FIG. 11, two of the mechanisms illustrated and described relative to FIG. 12 are provided along the length of the machine to provide for parallel vertical motion of the guide bar 300 in response to the action of two cams C1 mounted on the camshaft K.

FEEDER OPERATION - SINGLE STROKE

FIGS. 18A – 22B illustrate diagramatically operation of the feeder mechanism for single stroke operation. The term "single stroke" operation refers to utilization of the machine for the forming of box parts from larger blanks. In this mode of operation, a single blank that was pulled onto the longitudinal dies D by the vacuum cups 18 during the preceding advance of the feed mechanism, is advanced to the transverse dies by a single stroke of the pushers 20.

0° POSITION

FIGS. 18A and 18B are diagrammatic plan and elevation views of the device at the 0° position of the main shaft M. The upper folding dies U and U1, U2 are not shown in these and succeeding operational diagrams. At the 0° position of the main shaft M the feeder F is in its retracted position and has just been raised. In FIGS. 18A and 18B, the first blank S1 was previously pulled onto the longitudinal dies D by the vacuum cups 18, and its end panels 11 have been bent down. The blank lifting assembly 16, has lifted a blank S2 from the stack and the vacuum cups 18 on the feeder mechanism have been raised into engagement with the leading edge of that blank. It will be noted in FIG. 18B that the connecting rod 52 is in alignment with the crank 50 at the 0° position of the main shaft M, which position is also considered to be the 0° position of the crank shaft 46. It will be recalled that the crank shaft 46 is rotated at twice the speed of rotation of the main shaft M.

90° POSITION

Referring to FIGS. 19A and 19B, the main shaft M has turned 90° which has rotated the crank shaft 46, 180° so that the connecting rod 52 and the crank shaft 50 are again in alignment. This has turned the large sprocket wheel 60 through a partial revolution, which has advanced the feeder F by means of the chain 76 and associated mechanism. During this 90° portion of the cycle, the feeder mechanism F is held in its raised position in response to the action of the cams C1, previously described in detail in connection with FIGS. 11 and 12. In FIGS. 19A and 19B the pushers 20 have slid the partially folded blank S1 off the longitudinal dies D onto the transverse dies D1, D2 and the side panels 12 of the blank S1 are now ready to be bent down at the transverse dies. Also in FIGS. 19A and 19B, the vacuum cups 18 on the feeder F have pulled the blank S2 from the stack onto the longitudinal dies D and the end panels 11 of the blank S2 are ready to be bent down by the upper folding dies U (not shown).

165° POSITION

FIGS. 20A and 20B illustrate the conditions when the main shaft M is at approximately the 165° position, feeder F, which was lowered for retraction just after the 90° position of FIGS. 19A and 19B, is now almost fully retracted by motion of the large sprocket wheel 60 in the opposite direction from that illustrated in FIG. 19B. Thus the feeder is being retracted beneath the blank S2 on the dies D. At about this position, the upper folding dies descend to bend down the end panels 11 of S2 and the side panels 12 of S1. The tabs 13 will have been folded in at the transverse dies.

180° POSITION

FIGS. 21A and 21B show the condition when the main crank shaft M is at its 180° position, with which the crankshaft 46 has been rotated 360° and is back at the position of FIG. 18A. However, although the feeder F is again fully retracted, it remains in its lowered position. The blank S2 is in the same position as before.

270° POSITION

FIGS. 22A and 22B show the conditions at 270° rotation of the main shaft M. The box part S1 of the transverse dies has been completed and if an automatic ejection system is provided, the elevator vacuum cups 22 will be in a position to raise the completed box part off the transverse dies D1, D2. The feeding mechanism F has been advanced from its retracted position of FIGS. 21A and 21B to its advanced position of FIGS. 22A and 22B. However, the feeder mechanism, is still lowered so that during its advance it cleared the blank S2 resting on the longitudinal dies D.

FINAL 90°

The final 90° rotation of the crank shaft M brings the crank shaft back to its 0° position shown in FIGS. 18A and 18B. The feeder F is retracted, while still in its lowered position, to clear the blank S2 on retraction. Just before the main shaft M reaches its 0° position, the feeder is raised to pick up a new blank S3 at the stack as illustrated in FIGS. 18A and 18B in connection with the blank S2. A completed box part S1 of FIGS. 22A and 22B will be raised clear of the transverse dies by the elevator vacuum cups 22, before the blank S2 is slid onto the transverse dies, during the next 90° of revolution of the main shaft M.

To summarize "single stroke" operation, during the first 90° of rotation of the main shaft M, the feeder was in raised position and completed a feeding stroke, as seen in FIG. 19B. This represented the first 180° rotation of the crank shaft 50.

Shortly after the 90° position of the main shaft M, the feeder F was lowered, retraction began. Panel bending began at about the 165° position, FIG. 20B. The feeder was fully retracted at the 180° position of the main shaft which represents 360° of rotation of the crank shaft, in FIG. 21B.

During the period of 180° – 360° rotation of the main shaft M, the feeder remained lowered and was advanced and retracted on an idle stroke by a full 360° rotation of the crank shaft 46. Since the feeder remained lowered on the idle stroke, it did not disturb blanks on the longitudinal dies D. After 360° of rotation of the main shaft M, which corresponds to 720° of the crankshaft 46, both shafts are at their 0° positions and the conditions of FIG. 18B are repeated.

Table 1 of FIG. 23 summarizes the operation just described and in view of the description previously presented, the table is believed to be self explanatory.

DOUBLE STROKE OPERATION

Although the apparatus of the present invention is particularly useful for handling larger blanks on "single stroke" operation, apparatus of the present invention can also be set up to handle smaller blanks, such as those handled by the apparatus of the aforesaid patent, on "double stroke" operation. During double stroke operation, the stroke of the feeder is reduced, an extension pusher is added, and it requires two feeding strokes with the feeder in its raised position, to push a given blank off the longitudinal dies and onto the transverse dies.

Referring to FIG. 24 which shows the machine at the 0° position, since smaller blanks are to be handled, a pusher extension 340 is bolted to the upstanding arm 290 of each pusher assembly F and an auxiliary pusher 20A is mounted at the forward end of each extension arm 340. Of course, when smaller blanks are handled, tables T are usually brought closer together, as are the transverse dies D1, D2, all described in detail in the aforesaid U.S. Pat. No. 3,259,030. These details are not critical to the present invention.

Another adjustment that is performed for "double stroke" operation is that the throw of the crank 50 is reduced so that the stroke of the feeder assembly during its reciprocation is approximately one half the stroke imparted to that assembly during the single stroke operation previously described. Thus, the clamp bolt connection 54 between the connecting rod 52 and the crank 50 is loosened, the connection is moved radially inwardly along the slot 56 in the crank shaft and the bolt 54 is retightened. Also in adjusting for this operation, it is usually necessary to retime the apparatus by resetting the position of the sprocket 66 on the hub 70 for the chain drive shaft 72, as provided for by the construction shown in FIG. 2A.

OPERATION

The diagrams of FIGS. 25A – 25J illustrate the principles of double stroke operation. The angular positions of the crank, crankshaft, etc. at the various degrees of shaft rotation corresponding to the diagrams and FIGS. 25A – 25J are the same as those previously described in conjunction with FIGS. 18B – 22B and hence these diagrams are not repeated. Furthermore, the timing of the folding dies is the same as that explained in connection with table 1 of FIG. 23 and reference to this timing will not be repeated.

0° POSITION

FIG. 25A illustrates the position of the feeder when the main shaft M is at its 0° position. The feeder F is in its raised and fully retracted position with the vacuum cups 18 ready to pick up a blank S1 at the stack. In the sequence to be described, it will be assumed that the machine is just being started up and that there are no blanks present on the longitudinal dies D or on the transverse dies D1, D2.

90° POSITION

In FIG. 25B, which illustrates the 90° position of the main shaft M, the feeder F is still raised and has been fully advanced. The vacuum cups 18 have pulled the first blank S1 off of the stack onto the longitudinal dies D. Since the feeding stroke has been shortened, the blank S1 is left at the rear of the dies D.

180° POSITION

FIG. 25C shows the conditions when the main shaft M has turned through 180°. The feeder F was lowered just after the main shaft passed its 90° position and the feeder was fully retracted as the main shaft M rotated from its 90° to its 180° position.

270° POSITION

FIG. 25D shows the position of the feeder F at the 270° position of the main shaft M. The feeder is still lowered and it was fully advanced on an idle stroke when the main shaft turned from its 180° position of FIG. 25C to its 270° position. Since the feeder is still lowered the blank S1 on the dies D is not disturbed during this portion of the idle stroke.

0° (360°) POSITION

FIG. 25E shows the position of the feeder when the main shaft has made one 360° turn back to its 0° position. The feeder F was retracted when the mainshaft turned from its 270° to its 0° position and is raised during the last few degrees of the first turn of the main shaft M so that the feeder is fully raised when the main shaft M reaches its 0° position. The vacuum cups 18 are now ready to pick up a blank S2 from the stack and the main pusher 20 is now ready to advance the first blank S1 along the dies D.

90° POSITION

FIG. 25F shows the parts at the 90° position and hence corresponds to the position of the parts previously shown in connection with FIG. 25B. The feeder F is still raised and was fully advanced as the main crank shaft turned from its 0° to its 90° position. The vacuum cups 18 have drawn the second blank S2 onto the dies D and the main pusher 20 has slid the first blank S1 along the dies D towards the transverse dies D1, D2.

It is to be understood that in describing double stroke operation, the action of the bending dies U, U1 and U2 is not described because these dies operate at about 165°, as explained in conjunction with single stroke operation and in conjunction with table I of FIG. 23, which applies to both modes of operation.

180° (540°) POSITION

FIG. 25G shows the position of the feeder at the 180° (540°) position of the main shaft M. As indicated on FIG. 25G, the feeder was lowered just after the 90° position of the main shaft and was fully retracted during the rotation of that shaft from its 90° position to its 180° position. During this retraction the pushers 20 and 20A, being lowered, cleared the blanks S2 and S1 which lie undisturbed on the longitudinal dies D.

270° POSITION

FIG. 25H shows the feeder at the 270° position of the main shaft M. The feeder was advanced on an idle stroke when the shaft rotated from its 180° to its 270° position. However, the feeder is still lowered so that the pushers cleared the blanks S2, S1 during the aforesaid advance thereof.

0° POSITION

FIG. 25I illustrates the position of the feeder when the main shaft M has turned from its 270° position (FIG. 25H) back to its 0° position which represents a total of 720° of main shaft rotation, starting from the 0° position first described in conjunction with FIG. 25A. As illustrated in FIG. 25I, the feeder was retracted as the main shaft M rotated from its 270° position to its 0° position. Just before reaching the 0° position the feeder was raised so that it is fully raised at the 0° position. It will be noted that the auxiliary pusher 20a has been raised up in between the blanks S2 and S1. Adjustment of the blank pickup assembly 16, described in conjunction with FIGS. 2B and 2C, and the timing of the feed chain shaft 72 by means of the adjustable sprocket 66 shown in FIG. 2A, facilitate adjustment and timing of the apparatus so that the pusher 20a will be lifted between the blanks S1 and S2 as illustrated in FIG. 25I.

90° POSITION

FIG. 25J shows the positions of the feeder after the crankshaft has turned through the first 90°, after the 0° position of FIG. 25I. The position of FIG. 25J corresponds to that of FIGS. 25B and 25F. The feeder F is still raised and it was fully advanced in its raised condition when the main shaft rotated from its 0° to its 90° position. Thus, the vacuum cups 18 pull the third blank S3 from the stack onto the longitudinal dies D. The main pusher 20 has pushed the blank S2 farther along the dies, from the position shown in FIG. 25A to that of FIG. 25J. The extension pusher 20a has slid the first blank S1 from the longitudinal dies D onto the transverse dies D1, D2 as shown in FIG. 25J.

As can be seen from the aforesaid diagrams showing double stroke operation, two blanks are on the longitudinal dies D when the upper bending dies U descend to fold down the end panels 11. For example, referring to FIGS. 25F and 25G, these figures represent the 90° and the 180° position of the main shaft M.

In between the position of these figures, namely at about the 165° position, the folding dies descend upon the blanks. Thus the blank S2 recently drawn onto the dies D will have its end panels 11 folded down by the upper folding dies U. the end panels on the blank S1 (none of the end panels are shown in FIGS. 25F and G) will have been previously folded down by the upper folding dies at the 165° position between the 90° and 180° positions of FIGS. 25B and 25C. This second descent of the upper folding dies U on the previously folded blank S1 has no effect thereon because its longitudinal panels were folded previously, as just described.

Having described the operation of the machine with both single stroke and double stroke operation, it can be seen that the advantages of a simple harmonic motion feed using a crank are attained in both modes of operation. Also by gearing the crank shaft up to run at twice the speed of rotation of the main shaft, a full 180° crank rotation is attained through only 90° rotation of the main shaft. The full 180° crank rotation is sufficient to fully advance the feed mechanism and perform the feeding operation in either single or double stroke operation. However, since the main shaft is only rotated 90° during the feeding operation, this leaves 270° of main shaft rotation for completion of the box part by the various dies and folding elements that have been briefly described.

Although the best mode contemplated for carrying out the present invention has been herein shown and described, it will be apparent that modification and variation may be made without departing from what is regarded to be the subject matter of the invention.

I claim:

1. Apparatus for forming plastic box parts form corner notched blanks which have main panels, side panels and end panels having tabs; said apparatus comprising laterally spaced longitudinal die sets for folding the end panels, longitudinally spaced transverse die sets in longitudinal alignment with said longitudinal die sets for folding the side panels, anvils at the ends of said transverse die sets, tab folders having end panel clamps for cooperation with said anvils, said tab folders having combined solvent applicator and tab folder bars for folding said tabs, means for supplying solvent to said applicator bars, and means for feeding blanks along said die sets; the improvement wherein the tab engaging faces of said solvent applicator bars are formed with a plurality of vertical grooves, said solvent supplying means having means for directing solvent to the upper ends of said grooves, for flowing solvent down along said grooves.

2. The apparatus of claim 1, wherein said solvent applicator bars are formed of metal.

3. The apparatus of claim 1, comprising excess solvent catchers at the bottom of said solvent applicator bars and means for returning solvent from said catchers to said solvent supply means.

4. The apparatus of claim 3, wherein said solvent supply means comprises a solvent reservoir, a pump for pumping solvent from said reservoir, lines connecting said pump to said applicator bars, aspirator means connected to said pump, and suction lines connecting said aspirator means to said solvent catchers for returning excess solvent to said reservoir.

5. The apparatus of claim 4 wherein said aspirator means comprises a venturi tube for each solvent applicator bar, said suction lines being connected to the throats of said venturi tubes, said venturi tubes returning the solvent pumped therethrough and the aspirated solvent to said reservoir.

6. The apparatus of claim 4, comprising valve means for adjustably restricting the flow of solvent to each applicator bar, said valve means causing the majority of the solvent from said pump to flow through said aspirator means.

7. Apparatus for forming plastic box parts from corner notched blanks which have main panels, side panels and end panels having tabs; said apparatus comprising laterally spaced longitudinal die sets for folding the end panels, longitudinally spaced transverse die sets in longitudinal alignment with said longitudinal die sets for folding the side panels, anvils at the ends of said transverse die sets, having end panel clamp faces and tab engaging side faces, tab folders having end panel clamps for cooperation with confronting clamp faces on said anvils, said tab folders having combined solvent applicator and tab folder bars for bending said tabs against cooperating side faces on said anvils, and means for supplying solvent to said applicator bars; the improvement comprising a heating element mounted in each anvil for heating the side face thereof, each clamp face being provided by a thin metal strip spaced from the body of the anvil, and heat insulator means disposed between said metal strip and the anvil body.

8. The apparatus of claim 7, comprising non-metallic fastener means for securing said metal strip to said anvil.

9. The apparatus of claim 7, wherein said metal strip is formed of a metal having a high heat conductivity.

10. The apparatus of claim 9, comprising cooling fin means on said metal strip.

11. Apparatus for forming plastic box parts from blanks having main, side and end panels, said apparatus comprising laterally spaced longitudinal die sets for folding the end panels, longitudinally spaced transverse die sets in longitudinal alignment with said longitudinal die sets for folding the side panels, each of said die sets comprising fixed lower dies and cooperating upper bending dies, and feed means including means for feeding blanks from said longitudinal die sets to said transverse die sets; the improvement comprising means for heating said lower transverse dies, said heating means for each die comprising a flexible, rope-like electric heating element that is longer than the die and means for detachably clamping a portion of said flexible heating element along the length of the inner face of said die and adjacent the upper edge thereof, the non-clamped portion of said flexible heating element being exposed to the atmosphere.

* * * * *

UNITED STATES PATENT OFFICE
CERTIFICATE OF CORRECTION

Patent No. 4,032,280          Dated June 28, 1977

Inventor(s) FREDERICK D. ROBERTS

It is certified that error appears in the above-identified patent and that said Letters Patent are hereby corrected as shown below:

Col. 2, line 59: change "simply" to --simple--

Col. 3, line 17: change "positionit" to --position it-- line 62: after "crank" insert --(--

Col. 4, line 63: change "large" to --larger-- line 64: change "thicknes" to --thickness--

Col. 5, line 21: change "includes" to --include--

Col. 6, line 62: after "arbitrary." begin new paragraph with -- Major elements of the machine--

Col. 7, line 10: after "the" insert --blank-- line 27: change "folder" to --folded-- line 27: change "tab" to --tabs-- line 37: change "having" to --have--

UNITED STATES PATENT OFFICE
CERTIFICATE OF CORRECTION

Patent No. 4,032,280                    Dated  June 28, 1977

Inventor(s)  FREDERICK D. ROBERTS

It is certified that error appears in the above-identified patent and that said Letters Patent are hereby corrected as shown below:

Col.  7, line 56:  change "at" to --al-- line 62:  change "illutrated" to --illustrated-- line 64:  change "incorported" to --incorporated--

Col.  8, line 25:  before "panels" insert --end-- line 43:  change "manin" to --main-- line 48:  change "value" to --valve-- line 49:  after "vacuum" insert --.--

Col.  9, line 28:  after "and" delete --and-- line 39:  after "76" insert --(--

Col. 10, line 27:  change "provided" to --pivoted--

Col. 11, line 19:  change "foresaid" to --aforesaid-- line 46:  change "surface" to --surfaces--

UNITED STATES PATENT OFFICE
CERTIFICATE OF CORRECTION

Patent No. 4,032,280      Dated June 28, 1977

Inventor(s) FREDERICK D. ROBERTS

It is certified that error appears in the above-identified patent and that said Letters Patent are hereby corrected as shown below:

Col. 11, line 54:  change "operates" to --operate--

Col. 12, line 67:  after "described" delete --.--

Col. 13, line  9:  change "and" to --or-- line 11:  change "16A" to --26A-- line 33:  change "tht" to --that--

Col. 14, line 11:  change "he to --the-- line 28:  change "heating" to --heated-- line 41:  after "a" delete --a-- line 60:  after "face" insert --which--

Col. 15, line 13:  change "trip" to --strip-- line 23:  before "247" change "flange" to --flanges-- line 54:  change "tub" to --tube--

UNITED STATES PATENT OFFICE
CERTIFICATE OF CORRECTION

Patent No. 4,032,280  Dated June 28, 1977

Inventor(s) FREDERICK D. ROBERTS

It is certified that error appears in the above-identified patent and that said Letters Patent are hereby corrected as shown below:

Col. 16, line 20: after "overflow" insert --.-- line 25: change "1" to --11--

Col. 17, line 6: before "push" insert --a vertical--

Col. 21, line 40: change "positions" to --position--

Signed and Sealed this

Twentieth Day of November 1979

[SEAL]

Attest:

RUTH C. MASON
Attesting Officer

LUTRELLE F. PARKER
Acting Commissioner of Patents and Trademarks